(12) United States Patent
Kelling

(10) Patent No.: US 12,497,088 B2
(45) Date of Patent: Dec. 16, 2025

(54) SEPARABLE WHEEL PACK ASSEMBLY

(71) Applicant: Jeffrey Kelling, Wauwatosa, WI (US)

(72) Inventor: Jeffrey Kelling, Wauwatosa, WI (US)

( * ) Notice: Subject to any disclaimer, the term of this patent is extended or adjusted under 35 U.S.C. 154(b) by 357 days.

(21) Appl. No.: 18/111,294

(22) Filed: Feb. 17, 2023

(65) Prior Publication Data
US 2023/0202546 A1 Jun. 29, 2023

Related U.S. Application Data

(63) Continuation-in-part of application No. 16/706,145, filed on Dec. 6, 2019, now Pat. No. 11,584,419.
(Continued)

(51) Int. Cl.
*B62B 5/06* (2006.01)
*B62B 1/12* (2006.01)
(Continued)

(52) U.S. Cl.
CPC .............. *B62B 5/0069* (2013.01); *B62B 1/12* (2013.01); *B62B 5/0023* (2013.01);
(Continued)

(58) Field of Classification Search
CPC ......... B62B 5/068; B62B 5/0023; B62B 5/02; B62B 5/00; B62B 5/06; B62B 5/04; B62B 5/0438; B62B 5/0069; B62B 5/0046; B62B 5/0404; B62B 1/10; B62B 1/12; B62B 1/00; B62B 1/08; B62B 1/18; B62B 1/183; B62B 1/186; B62B 1/20; B62B 1/208;
(Continued)

(56) References Cited

U.S. PATENT DOCUMENTS 2,401,986 A * 6/1946 Talbott .................. B62B 5/0023
280/645
3,550,997 A * 12/1970 Strand ................... B62B 5/0023
280/30
(Continued)

FOREIGN PATENT DOCUMENTS

| DE | 102014012750 A1 | 3/2016 |
|----|-----------------|--------|
| EP | 2679467 A2 | 1/2014 |
| WO | 9939960 | 8/1999 |

OTHER PUBLICATIONS

International Search Report and Written Opinion from PCT/US2019/65032, dated Jun. 3, 2020.

*Primary Examiner* — James A Shriver, II
*Assistant Examiner* — James Dolak
(74) *Attorney, Agent, or Firm* — Boyle Fredrickson, S.C.

(57) ABSTRACT

A wheel pack assembly includes a pack portion wearable by a user, a wheeled portion removably coupled to the pack portion, and a power assist system. The pack portion includes a first interfit element. The wheeled portion includes a frame, a second interfit element coupled to frame and configured to removably couple with the first interfit element of the pack portion, and a first wheel set coupled to the frame and disposed at a location spaced apart from a rear end of the wheeled portion. The power assist system includes a motor mechanically coupled to the first wheel set, at least one sensor coupled to the at least one of the first interfit element and the second interfit element, and a controller configured to operate the motor based on feedback from the at least one sensor.

20 Claims, 19 Drawing Sheets

Related U.S. Application Data

(60) Provisional application No. 62/775,984, filed on Dec. 6, 2018.

(51) Int. Cl.
  *B62B 5/00* (2006.01)
  *B62B 5/04* (2006.01)

(52) U.S. Cl.
  CPC .......... *B62B 5/0046* (2013.01); *B62B 5/0404* (2013.01); *B62B 5/068* (2013.01)

(58) Field of Classification Search
  CPC .. B62B 1/24; B62B 3/008; B62B 3/00; B62B 3/08; B62B 3/12; B62B 3/02; B62B 3/022; B62B 2301/08; B62B 2301/20; B62B 2202/42
  See application file for complete search history.

(56) References Cited

U.S. PATENT DOCUMENTS

| | | | |
|---|---|---|---|
| 3,820,807 A | 6/1974 | Curran | |
| 3,973,754 A | 8/1976 | Chadwick, Jr. | |
| 4,045,040 A | 8/1977 | Fails | |
| 4,664,395 A | 5/1987 | McCoy | |
| 4,838,565 A | 6/1989 | Douglas et al. | |
| 5,005,844 A * | 4/1991 | Douglas | B62B 5/068 |
| | | | 172/350 |
| 5,215,355 A | 6/1993 | Klumpjan | |
| 5,385,355 A | 1/1995 | Hoffman | |
| 5,769,431 A * | 6/1998 | Cordova | B62D 51/04 |
| | | | 280/47.131 |
| 6,131,917 A | 10/2000 | Walsh | |
| 6,139,033 A | 10/2000 | Western | |
| 6,341,787 B1 * | 1/2002 | Mason | B62B 1/18 |
| | | | 280/47.26 |
| 6,361,063 B1 | 3/2002 | Daeschner | |
| 6,467,559 B1 * | 10/2002 | Farrell | B62D 51/065 |
| | | | 180/186 |
| 6,561,529 B2 * | 5/2003 | Darling, III | B62B 1/002 |
| | | | 280/79.2 |
| 6,631,777 B1 * | 10/2003 | Thompson | B62M 27/02 |
| | | | 180/181 |
| 6,793,236 B1 * | 9/2004 | Mitchell | B62B 5/005 |
| | | | 280/47.24 |
| 6,935,643 B1 | 8/2005 | Purpuro | |
| 7,172,207 B2 * | 2/2007 | Henry | B60D 1/00 |
| | | | 280/40 |
| 7,322,584 B1 | 1/2008 | Parker | |
| 7,484,737 B2 | 2/2009 | Satorius | |
| 7,549,648 B2 * | 6/2009 | Girard | B62B 1/208 |
| | | | 224/184 |
| 7,600,764 B1 * | 10/2009 | Parker | B62B 5/068 |
| | | | 280/416 |
| 7,770,913 B2 * | 8/2010 | Cannon | B62B 1/12 |
| | | | 280/656 |
| 7,967,325 B1 | 6/2011 | Burton et al. | |
| 8,366,125 B2 * | 2/2013 | Loomans | B62B 3/009 |
| | | | 280/47.17 |
| 8,672,202 B2 | 3/2014 | Tayar | |
| 8,733,766 B2 * | 5/2014 | Nieman | A45C 13/385 |
| | | | 280/47.17 |
| 8,789,730 B2 | 7/2014 | Mroczka | |
| 8,893,937 B1 | 11/2014 | Bristol | |
| 9,185,952 B1 * | 11/2015 | Turney | A45C 13/385 |
| 9,357,853 B2 * | 6/2016 | Oh | A47D 13/027 |
| 9,364,060 B2 * | 6/2016 | Bristol | A45C 5/14 |
| 10,112,638 B2 * | 10/2018 | Morse | A45F 3/14 |
| 11,254,341 B2 * | 2/2022 | Carlson | B62B 3/02 |
| 11,584,419 B2 * | 2/2023 | Kelling | B62B 5/068 |
| 11,679,795 B2 * | 6/2023 | Johnson | B62B 7/044 |
| | | | 280/1.5 |
| 11,745,776 B2 * | 9/2023 | Schambach | B62B 1/208 |
| | | | 280/47.31 |
| 12,263,874 B1 * | 4/2025 | Ransom | B62B 5/0046 |
| 2006/0273554 A1 | 12/2006 | Henry | |
| 2007/0075105 A1 | 4/2007 | Petrin | |
| 2007/0290460 A1 | 12/2007 | Girard et al. | |
| 2008/0197608 A1 * | 8/2008 | Dixon | A22B 7/006 |
| | | | 280/654 |
| 2012/0067932 A1 | 3/2012 | Tayar | |
| 2013/0300072 A1 | 11/2013 | Piaget et al. | |
| 2014/0203529 A1 | 7/2014 | Ortega | |
| 2016/0229438 A1 | 8/2016 | Morse | |

* cited by examiner

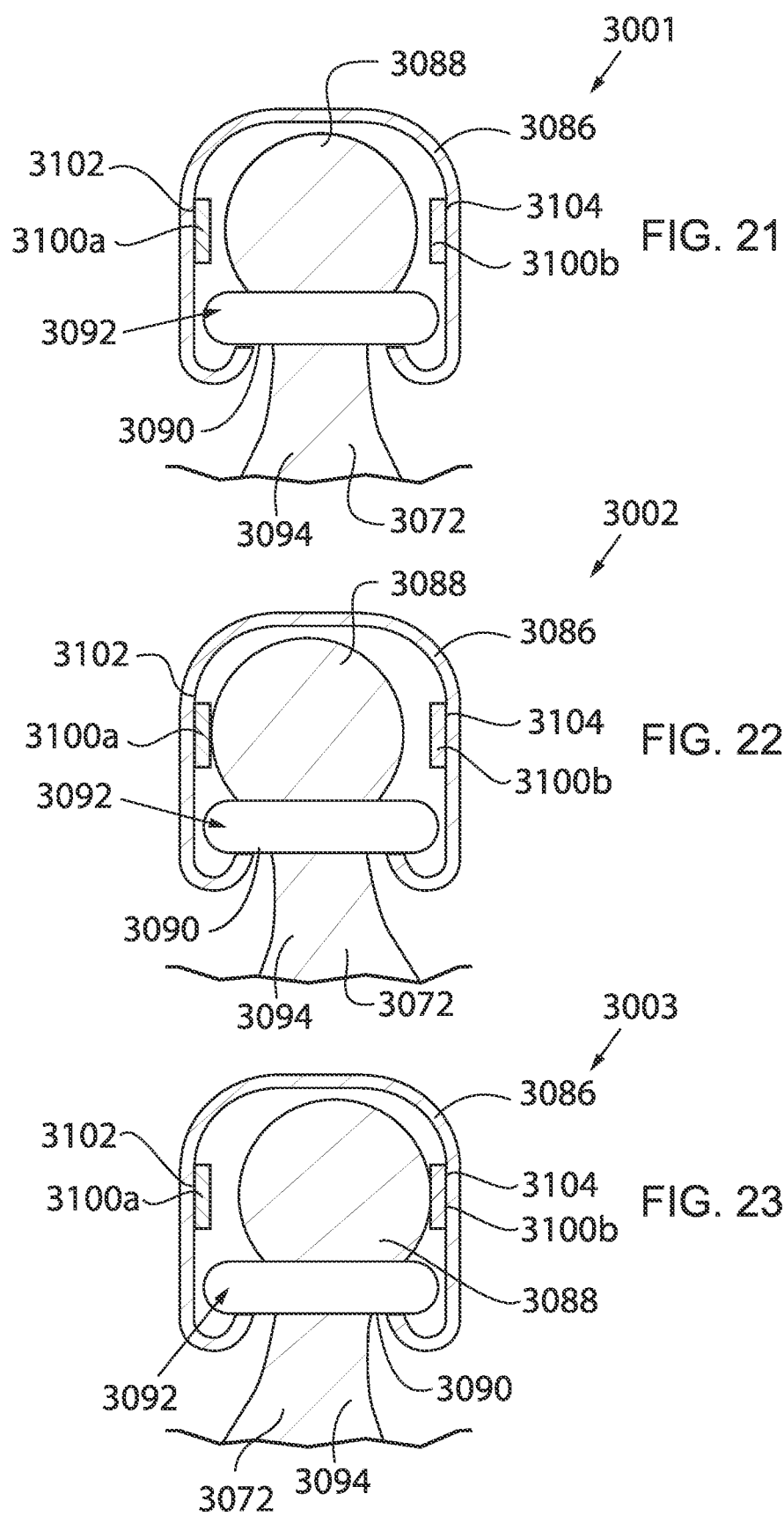

SEPARABLE WHEEL PACK ASSEMBLY

CROSS REFERENCE TO RELATED APPLICATIONS

This application is a continuation-in-part of and claims priority to U.S. Non-Provisional application Ser. No. 16/706,145 filed on Dec. 6, 2019 and titled "Separable Wheel Pack Assembly", which claims priority to U.S. Provisional Patent Application Ser. No. 62/775,984 filed on Dec. 6, 2018 and titled "Separable Wheel Pack Assembly", the disclosures of which are both incorporated herein.

BACKGROUND OF THE INVENTION

1. Field of the Invention

The present invention relates to a wheel pack assembly, and, in particular, a wheel pack assembly including a pack portion being removably attached to a wheeled portion and further including a power assist system.

2. Discussion of the Related Art

Hunters, hikers, foot soldiers, and rescue workers routinely traverse through the woods and over rough terrain while carrying gear, game, or other loads. Such loads usually require the assistance of equipment to assist in carrying the loads for long ranges and over a long period of time without exhausting the user. Known pack assembly solutions are rigid structures that do not compensate or adjust to the rough terrain usually encountered through such environments. As such, the user is subjected to every bump and bounce of the rough terrain, which can lead to premature exhaustion of the user over time. In addition, when traversing rough terrain through the woods, a user may need to maneuver or turn around in tight spaces.

As a result, there is a need in the art for a wheel pack assembly that reduces the stresses on the user to limit fatigue while the user carries a load over rough terrain and/or over longer distances. In addition, there is need in the art for a wheel pack assembly having stabilizing elements that compensate for the rough terrain in order to ease the stresses on the user as the load is carried over rough terrain for a period of time.

Further still, there is a need in the art for a wheel pack assembly having a carrier that is easily detachable from the pack. By allowing the carrier to easily detach from the pack, the maneuverability of the user and the carrier can be improved. In addition, when not traveling, the carrier can be easily detached from the pack and set on the ground to completely relieve the user of the load without having to remove the pack. Such considerations further improve the ease with the user may subsequently reassociate the pack and the carrier for operative association with one another when use of the assembly is desired.

Further yet, there is a need in the art for a wheel pack assembly having a power assist system configured to assist with speeding up and slowing down the carrier to assist a user in carrying the load over rough terrain and/or over longer distances.

SUMMARY OF THE INVENTION

The present invention discloses a wheel pack assembly including a pack portion being removably attached to a wheeled portion.

In accordance with one aspect of the application, a wheel pack assembly includes a pack portion wearable by a user, a wheeled portion removably coupled to the pack portion, and a power assist system. The pack portion includes a support frame having at least one articulating arm, at least one stabilizing element, and a first interfit element. The wheeled portion includes a frame having a first frame portion and a second frame portion, a second interfit element coupled to the frame and configured to removably couple with the first interfit element of the pack portion, and a first wheel set coupled to the frame and disposed at a location spaced apart from a rear end of the wheeled portion. The power assist system includes a motor mechanically coupled to the first wheel set, at least one sensor coupled to the at least one of the first interfit element and the second interfit element, and a controller configured to operate the motor based on feedback from the at least one sensor.

According to another aspect of the invention, the first interfit element of the pack portion includes a hitch coupled to the support frame and the second interfit element of the wheeled portion includes a coupler at a forward end of the wheeled portion. The at least one sensor may be disposed on the coupler. The controller may be configured to send a signal to the motor to increase rotation of the first wheel set in response to the at least one sensor detecting the second interfit element pushing on the first interfit element. Conversely, the controller may be configured to send a signal to the motor to decrease rotation of the first wheel set in response to the at least one sensor detecting the second interfit element pulling on the first interfit element.

According to yet another aspect of the invention, the at least one sensor may be in the form of a rocker switch. The rocker switch may comprise a pivot point where the coupler joins the wheeled portion allowing the coupler to rock forward and back in response to movement of the wheeled portion with respect to the pack portion.

In accordance with another embodiment of the invention, a wheel pack assembly includes a pack portion wearable by a user including a first interfit element, a wheeled portion, and a power assist system. The wheeled portion is removably coupled to the pack portion and includes a frame, a second interfit element coupled to frame and configured to removably couple with the first interfit element of the pack portion, and a primary wheel set coupled to the frame and disposed at a location spaced apart from a rear end of the wheeled portion. The power assist system includes a motor and/or a brake mechanically coupled to the primary wheel set, at least one sensor coupled to the at least one of the first interfit element and the second interfit element, and a controller configured to operate the motor and/or the brake based on feedback from the at least one sensor.

According to another aspect of the invention, the at least one sensor includes a rocker switch pivotably coupling the second interfit element to the frame of the wheeled portion. The rocker switch is configured to transition between a neutral position, a first position, and a second position in response to movement of the wheeled portion with respect to the pack portion. The controller may be configured to send a signal to the motor to not operate when the rocker switch is in the neutral position, sends a signal to the motor to decrease rotation of the first wheel set when the rocker switch is in the first position, and send a signal to the motor to increase rotation of the first wheel set when the rocker switch is in a second position.

According to yet another aspect of the invention, the first interfit element of the pack portion may include a hitch coupled to the support frame, while the second interfit element of the wheeled portion may include a coupler at a forward end of the wheeled portion. The at least one sensor may include a first sensor disposed within the coupler at a first location and a second sensor disposed within the coupler at a second location. Further, the controller may be configured to send a signal to the motor to not operate when neither the first sensor nor the second sensor is engaged, send a signal to decrease rotation of the primary wheel set when the first sensor is engaged by the hitch, and send a signal to the motor to increase rotation of the primary wheel set when the second sensor is engaged by the hitch.

According to another aspect of the invention, the coupler may include a locking mechanism in the form of one or more locking arms. A tension spring maintains the locking arms in a locked position without input from a user, while input from the user via an input device, such as a lever, may transition the locking arms from the locked position to tan unlocked position. In the locked position, the locking arms are spaced apart from each other by a distance less than the diameter of a ball of the hitch to prevent the hitch from being removed from the coupler. In the unlocked position, the locking arms are spaced apart from each other by a distance greater than the diameter of the ball of the hitch to allow the hitch to enter and leave the coupler.

According to yet another aspect of the invention, the coupler includes an opening having a plurality of distinct portions. For instance, the opening may include a central primary portion sized larger than the ball of the hitch to allow the hitch to enter the coupler and one or more secondary portions. The secondary portions are configured to extend outward (either forward, rearward, or in any other direction), from the primary portion and have a width less than the diameter of the ball of the hitch. As a result, the secondary portions allow for pivoting and movement of the hitch within the coupler, while the hitch is retained within the coupler.

These and other aspects, objects, and features of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE FIGURES

A clear conception of the advantages and features constituting the present invention will become more readily apparent by referring to the exemplary, and therefore non-limiting, embodiments illustrated in the drawings accompanying and forming a part of this specification, wherein like reference numerals designate the same elements in the several views.

In the drawings:

FIG. 21 is an enlarged cross-sectional side view of the coupler of FIG. 16 with a hitch disposed therein in a neutral position;

FIG. 22 is an enlarged cross-sectional side view of the coupler of FIG. 16 with the hitch disposed therein in a forward position;

FIG. 23 is an enlarged cross-sectional side view of the coupler of FIG. 16 with the hitch disposed therein in a rearward position;

DETAILED DESCRIPTION OF THE FIGURES

The present invention and the various features and advantageous details thereof are explained more fully with reference to the non-limiting embodiments described in detail in the following description.

Figure 1:
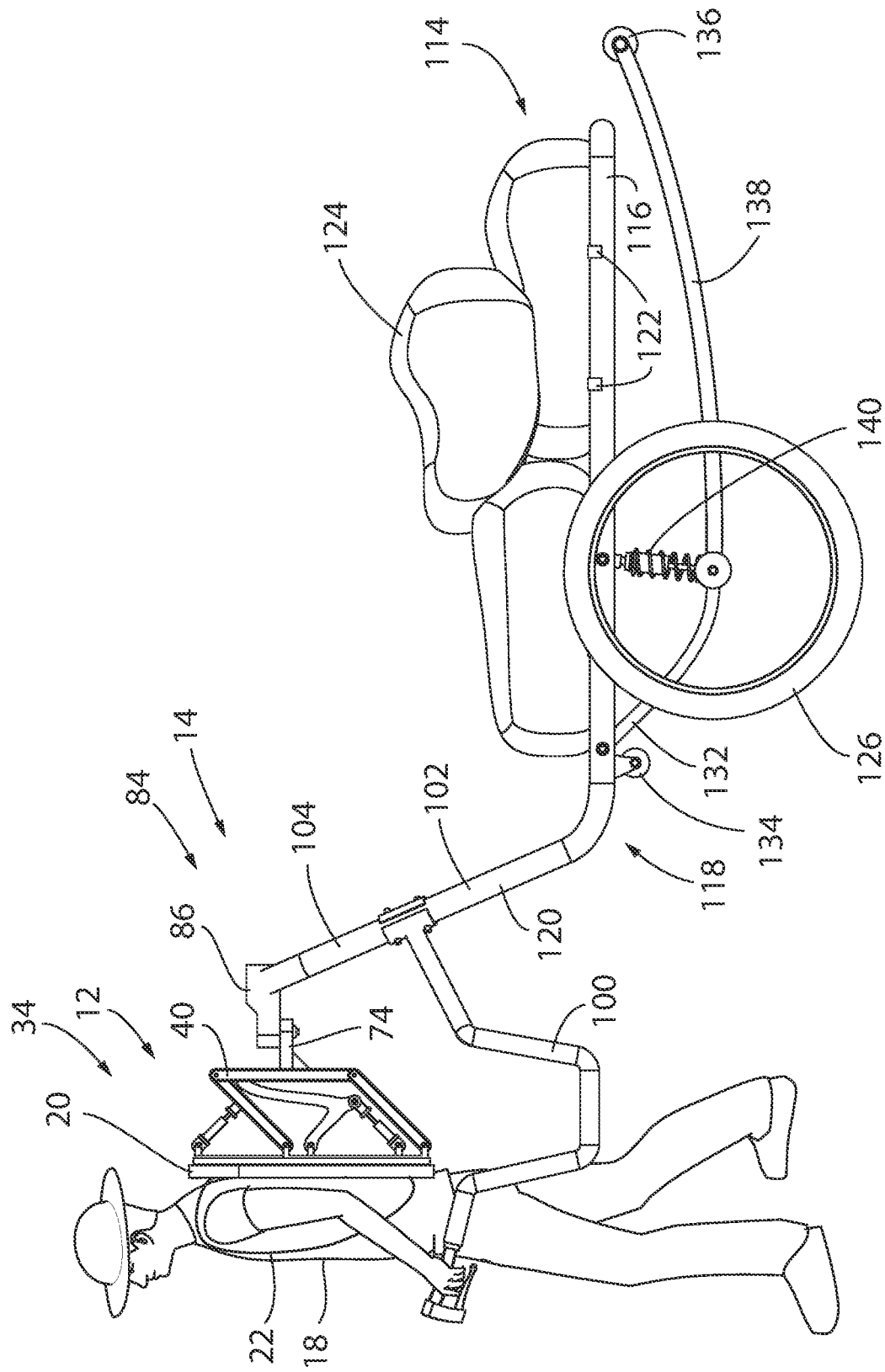
FIG. 1 is a side elevation view of a user wearing a wheel pack assembly according to the present application.
Figure 2:
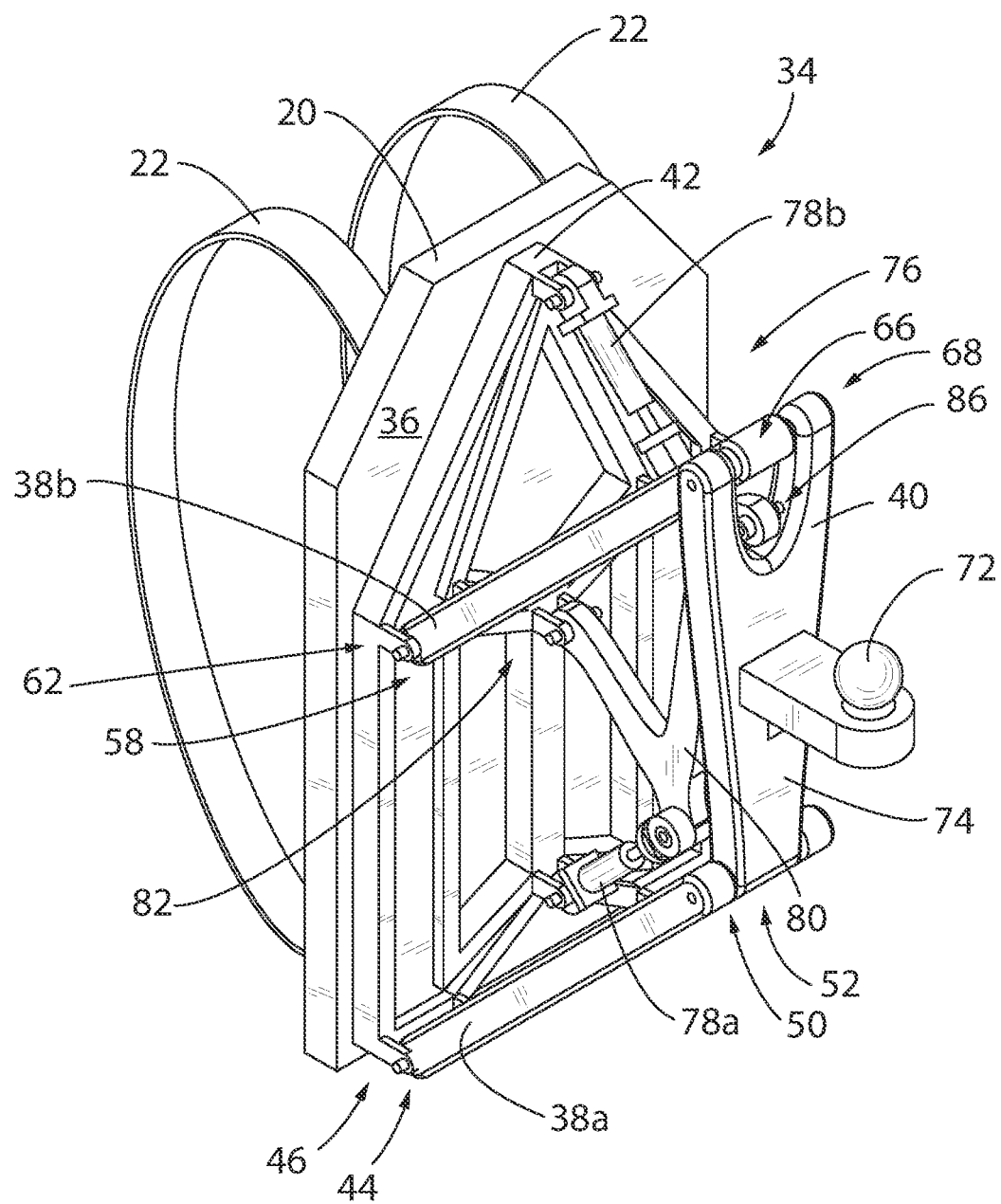
FIG. 2 is a rearward facing perspective view of a pack portion of the wheel pack assembly of FIG. 1 with the wheeled portion removed therefrom.
Figure 3:
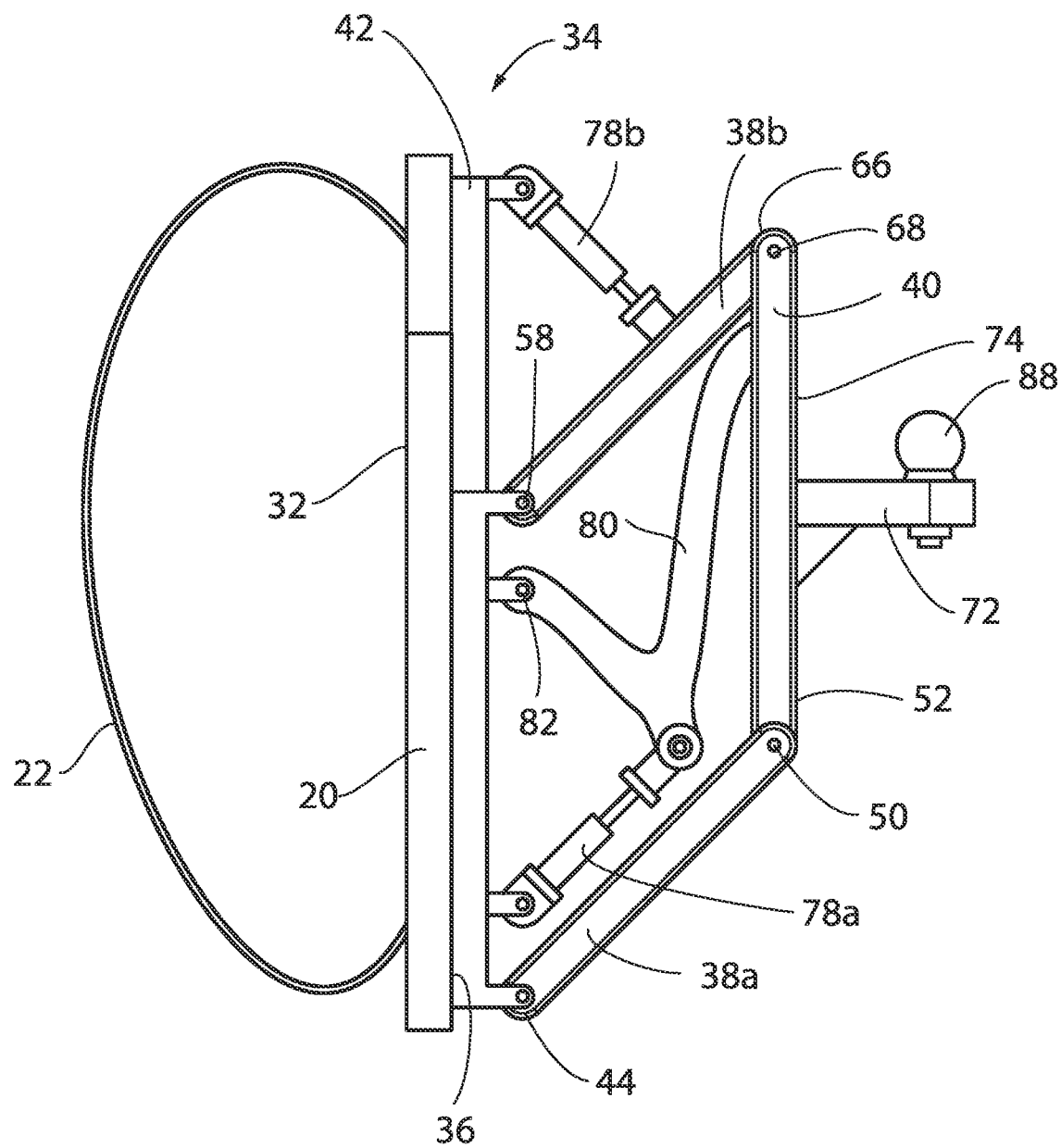
FIG. 3 is a side elevation view of the pack portion of FIG. 2.
Figure 4:
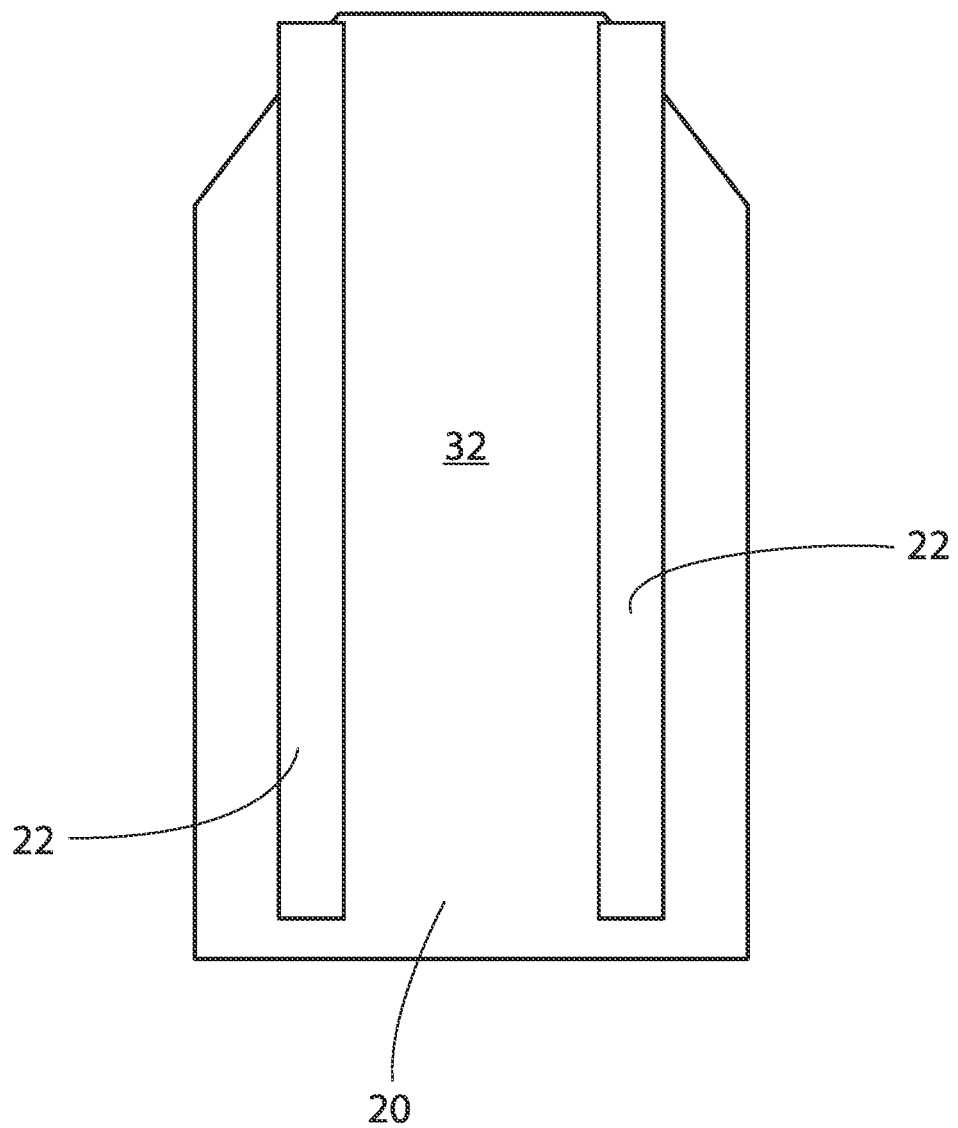
FIG. 4 is a front view, or forward or user facing view, of the pack portion of FIG. 2.

FIG. 1 depicts a side elevation view of a wheel pack assembly 10 according to the present invention. The wheel pack assembly 10 includes a pack portion 12 and a wheeled portion 14 that are removably coupled with each other by way of a ball and hitch connection 16. The wheel portion 14 will be further described with respect to FIGS. 6-10. The pack portion 12 of the wheel pack assembly 10 is configured to be worn by a user 18 and will be descripted in further detail below.

FIGS. 2-5 depict respective perspective, front, rear, side, top, and bottom side views of the pack portion 12 of the wheel pack assembly 10, according to an embodiment of the invention. The pack portion 12 includes a main body 20 that acts as a back support for the pack portion 12. In use, i.e. when a wearer or user 18 wears the pack portion 12, back support 20 is placed in contact with the back of user 18. At least one strap 22 is coupled to the back support 20. Similar to a backpack, each strap 22 includes a first end 24 coupled to an upper portion 26 of the back support 20 and a second end 28 coupled to a lower portion 28 of the back support 20. Each strap 22 is then spaced apart from the back support 20 to create an opening 30 configured to receive a respective arm and subsequently shoulder area of the user 18.

While the straps 22 are coupled to a front surface 32 of the back support 20, a support frame 34 is coupled to a rear surface 36 of the back support 20. The support frame 34 includes a number of articulating arms 38 extending from the back support 20 to a hitch plate 40. The support frame 34 may also include a pack frame 42 coupled to and oriented along the rear surface 36 of the back support 20. Each articulating arm 38 includes a first end 44 rotatably connected to the pack frame 42 and a second end 46 rotatably connected to the hitch plate 40.

Figure 5:
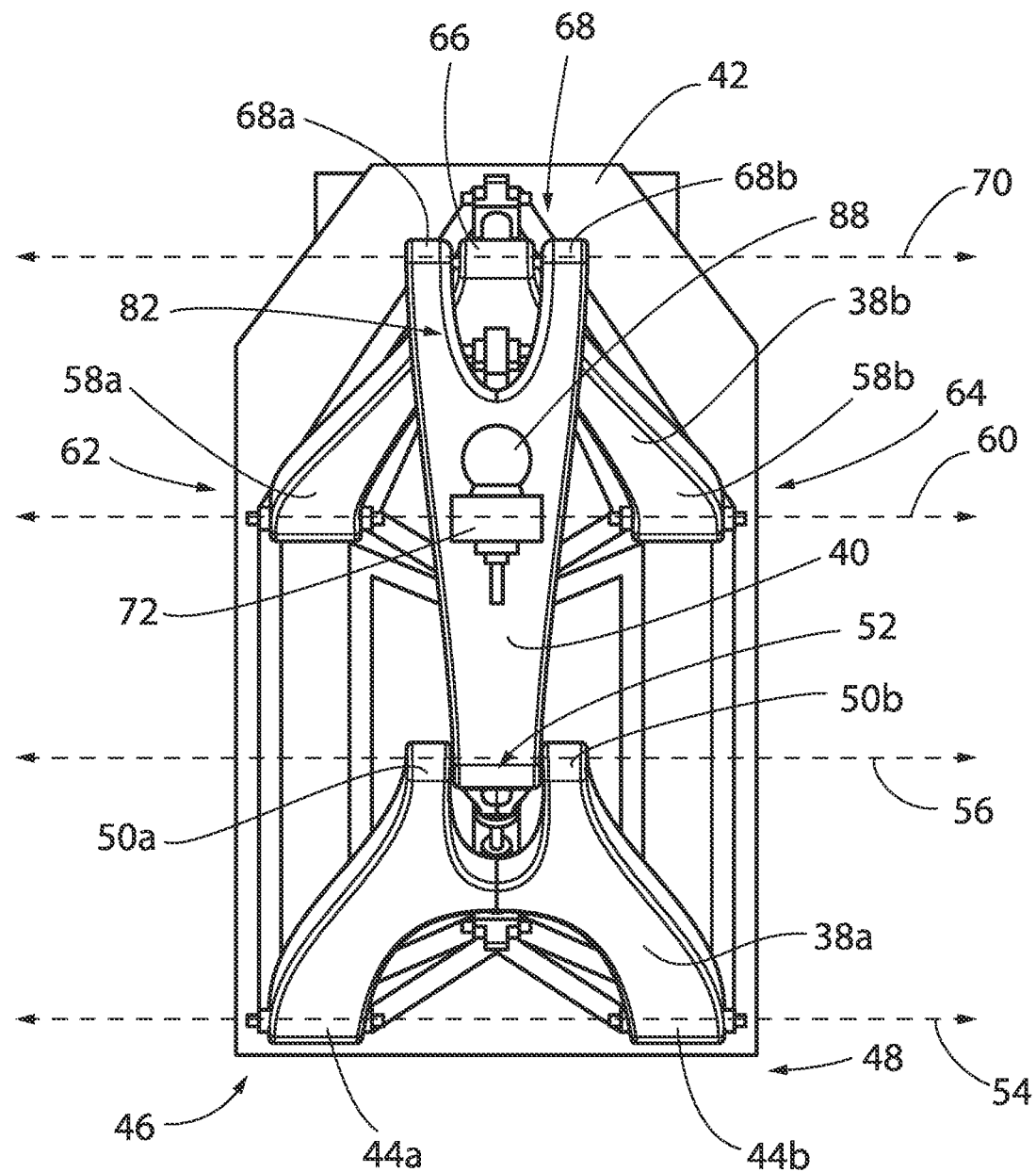
FIG. 5 is a rear elevation view of the pack portion of FIG. 2.

In the representative embodiment of the invention, the support frame 34 includes two (2) articulating arms 38. The lower articulating arm 38a includes a left first end 44a and a right first end 44b. The left first end 44a is coupled to the pack frame 42 at a lower left corner 46 of the pack frame 42, while the right first end 44b is coupled to the pack frame 42 at a lower right corner 48 of the pack frame 42. A left second end 50a is coupled to a lower end 52 of the hitch plate 40, and a right second end 50b is also coupled to the lower end 52 of the hitch plate 40. As shown in FIG. 5, the left and right first ends 44a, 44b of the lower articulating arm 38 are oriented along the same horizontal axis 54, which allows the lower articulating arm 38 to rotate about the horizontal axis 54. In addition, the left and right second ends 50a, 50b are oriented along the same horizontal axis 56, which allows the lower articulating arm 38a to also rotate about the horizontal axis 56. In turn, the lower articulating arm 38a and the hitch plate 40 are able to both rotate about the horizontal axis 56, while remaining coupled to each other.

Similarly, the upper articulating arm 38b includes a left first end 58a and a right first end 58b aligned with each other along a horizontal axis 60. The left first end 58a is coupled to the pack frame 42 at a left side location 62 of the pack frame 42, while the right first end 58b is coupled to the pack frame 42 at a right side location 64 of the pack frame 42. As stated above, the left and right first ends 58a, 58b of the upper articulating arm 38b are oriented along the same horizontal axis 60 to allow rotation of the upper articulating arm 38b about the horizontal axis 60. The upper articulating arm 38b also includes a second end 66 coupled to an upper end 68 of the hitch plate 40. In the representative embodiment of the invention, the upper end 68 of the hitch plate 40 includes a left upper end 58b and a right upper end 68b. The second end 66 of the upper articulating arm 38b and the upper end 68 of the hitch plate 40 are aligned with each other along a horizontal axis 70, which allows the upper articulating arm 38b and hitch plate 40 to rotate about the horizontal axis 70, while remaining coupled to each other.

While the representative embodiment of the invention depicts the lower articulating arm 38a having respective left and right first ends 44a, 44b and respective left and right second ends 50a, 50b, other embodiments of the invention may include any number of first and second ends 44, 50. Similarly, varying embodiments of the invention may have the upper articulating arm 38b with any number of first or second ends 58, 68. Further yet, the hitch plate 40 of varying embodiments of the invention may include any number of upper and lower ends 68, 52.

As shown in FIGS. 1-5, a hitch 72 extends from an outer surface 74 of the hitch plate 40. In some instances, the hitch 72 may be cantilevered from the hitch plate 40. The arrangement of horizontal axes 54, 56, 60, 70 described above, allows for the hitch 72, to move in the vertical and horizontal planes in response to the terrain intended to be traversed by the pack assembly 10 and user 18. The pack portion 12 may further include a stabilizing assembly 76 to maintain the hitch 72 in a neutral position when no forces are exerted on the support frame 34. The stabilizing assembly 76 includes at least one stabilizing element 78, such as, but not limited to, a shock absorber or spring, and at least one stabilizing arm 80. In the representative embodiment of the invention, the stabilizing assembly 76 includes a first stabilizing element 78a, a second stabilizing element 78b, and a stabilizing arm 80. The stabilizing arm 80 extends from the pack frame 42 to the hitch plate 40. The first stabilizing arm 78a extends from the pack frame 42 to a location 82 of the stabilizing arm 80 spaced apart from the pack frame 42. While the stabilizing arm 80 is depicted as having a v-shaped geometry, other embodiments of the invention may include any shaped stabilizing arm 80. In addition, the second stabilizing element 78b extends from the pack frame 42 to the upper articulating arm 38b. As stated above, the stabilizing elements 78a, 78b work in conjunction with the articulating arms 38 to maintain the hitch 72 in a neutral position and stabilize the hitch 72 during operation of the pack assembly 10.

In other embodiments of the invention, the first stabilizing element 78a may be coupled to the lower articulating arm 38a and the second stabilizing element 78b may be coupled to the stabilizing arm 80. While the representative embodiment of the invention depicts the stabilizing arm 80 as being coupled to the hitch plate 40 at a location 82 below the upper end 68 of the hitch plate 40, it is contemplated that the stabilizing arm 80 may be coupled to the hitch plate 40 at any location at or between the upper and lower ends 68, 52 of the hitch plate 40. In yet other embodiments of the invention, the stabilizing system 76 may include one or more stabilizing elements 78 without the inclusion of a stabilizing arm 80. In such instances, each stabilizing element 78 would extend from the pack frame 42 to an articulating arm 38.

Figure 6:
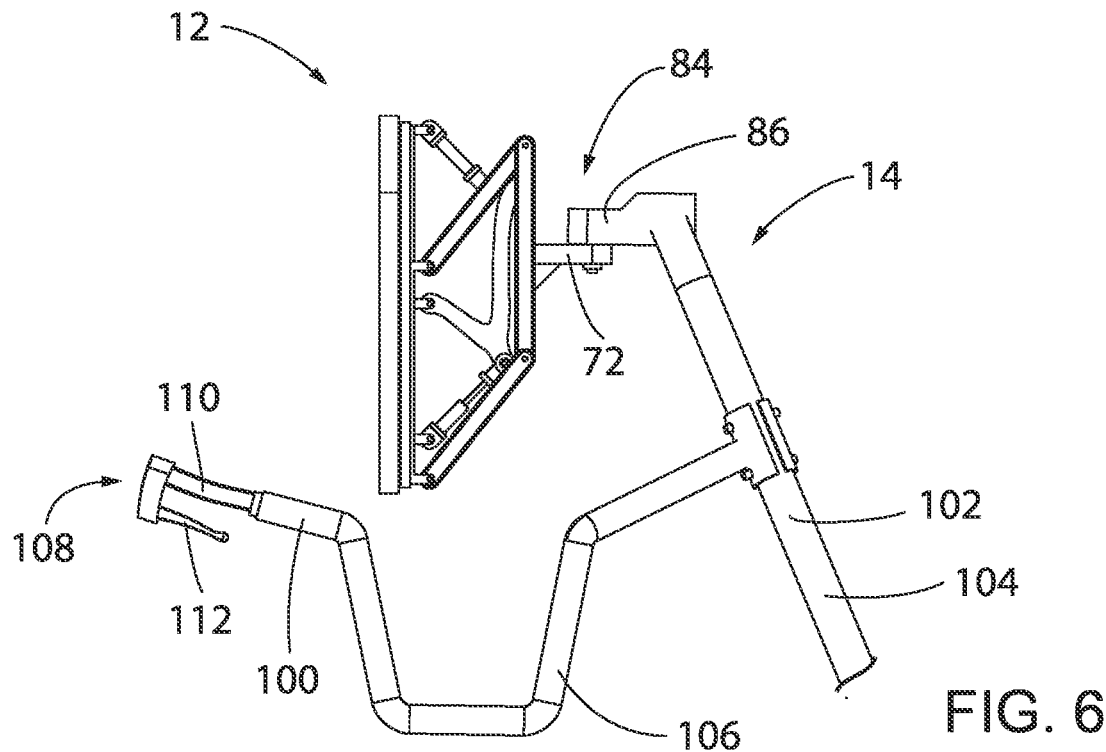
FIG. 6 is a side elevation view of a front portion of the wheel pack assembly of FIG. 1 in a forward directed tilted position.
Figure 7:
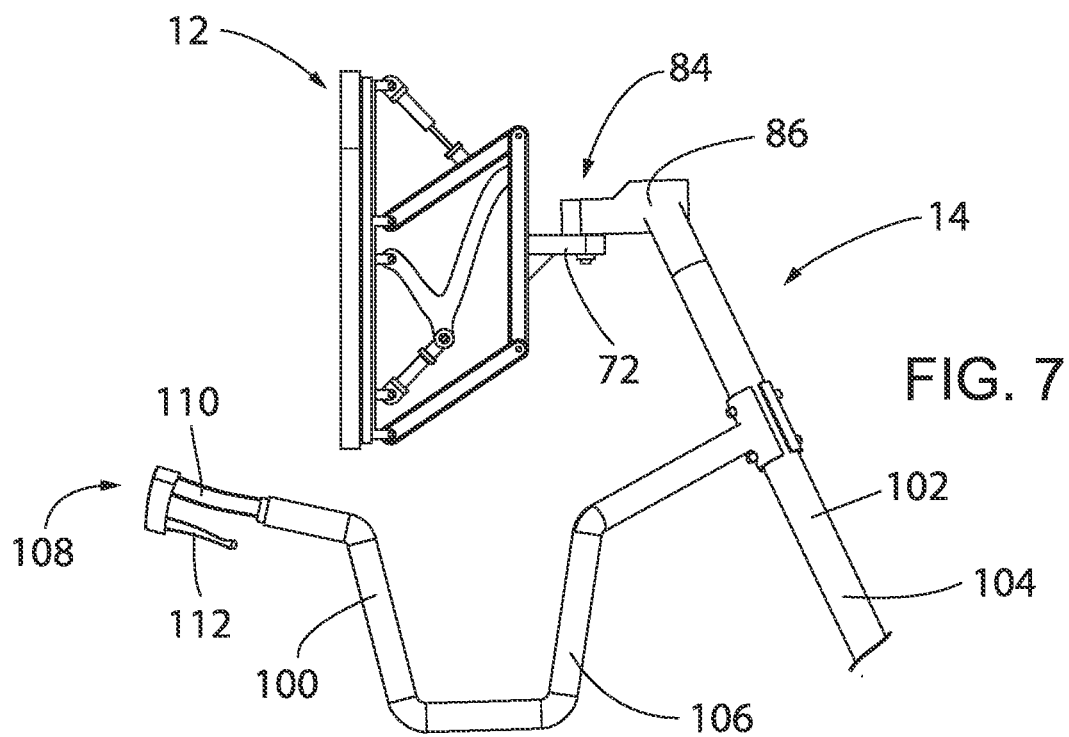
FIG. 7 is a side elevation view of the front portion of the wheel pack assembly of FIG. 1 in a rearward directed tilted position.
Figure 8:
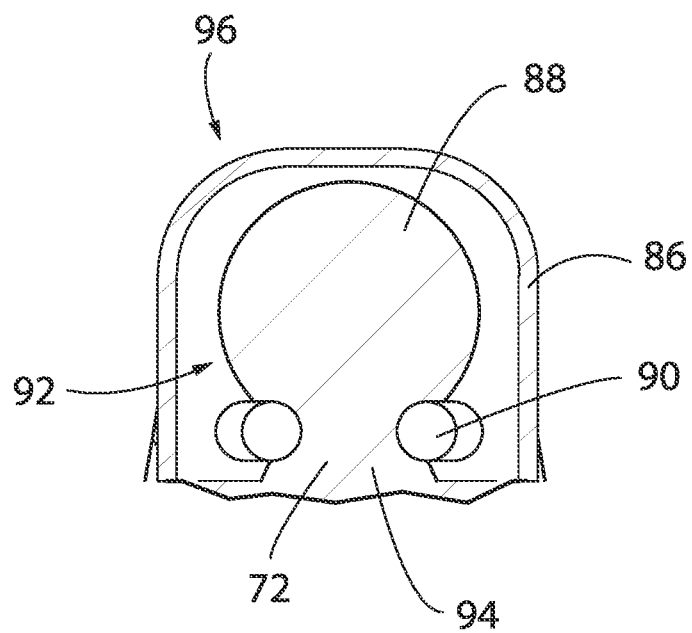
FIG. 8 is a cross-sectional front view of a ball and hitch connection of the wheel pack assembly in a closed position.
Figure 9:
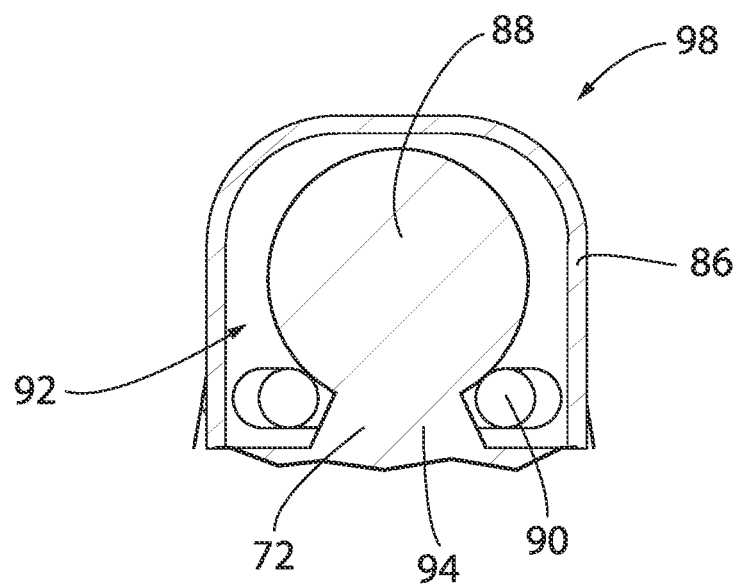
FIG. 9 is a cross-sectional front view of the ball and hitch connection of the wheel pack assembly in an open position.

Referring now to FIGS. 6 and 7, the pack portion 12 is shown attached to a forward end 84 of the wheeled portion 14. The forward end 84 of the wheeled portion 14 includes a coupler 86 configured to receive the ball 88 of the hitch 72. The coupler 86 and hitch 72 are configured to interfit with each other to removably couple the pack portion 12 to the wheeled portion 14. FIGS. 8 and 9 further depict the interfit of the hitch 72 and the coupler 86. In the representative embodiment of the invention, the coupler 86 may include a locking mechanism 90 disposed within an interior 92 of the coupler 86. The locking mechanism 90 is configured to at least partially surround a neck 94 of the hitch 72, which has a smaller diameter than that of the ball 88 of the hitch 72. The locking mechanism 90 transitions between a locked position 96 (FIG. 8) and an unlocked position 98 (FIG. 9).

In the locked position 96, the locking mechanism 90 is brought adjacent the neck 94 of the hitch 72 and sized to be smaller than the diameter of the ball 88 of the hitch 72. As a result, the locking mechanism 90 prevents disengagement between the ball 88 and coupler 86 when in the locked position 96. It should be appreciated that, when locked or unlocked, the cooperation between ball 88 and couple 86 is configured to allow relative rotation therebetween. Conversely, in the unlocked position 98, the locking mechanism 90 is spaced apart from the neck 94 of the hitch and sized to be larger than the diameter of the ball 88 of the hitch 72. When unlocked, hitch 72 may be disengaged from ball 88 via relative vertical translation therebetween. As a result, the coupler 86 and ball 88 are easily separated from each other when the locking mechanism 90 is in the unlocked position 98.

FIGS. 6 and 7 further illustrate handle bars 100 extending from a forward shaft 102 of a frame 104 of the wheeled portion 14. The frame 104 may comprise hollow tubes to reduce the weight of the wheeled portion 14. The handle bars 100 extend forward from the forward shaft 102 of the frame 104 and toward respective sides of the user 18, as shown in FIG. 1. As such, the handle bars 100 include a left handle bar 100a extending to a left side of the user 18 and a right handle bar 100b extending to a right side of the user 18. Each handle bar 100 includes a dipped portion 106 extending downward, the benefits of which will be described later. Further, each handle bar 100 includes a distal end 108, which may have a hand grip 110 and a lever 112. In one embodiment of the invention, the lever 112a left handle bar 110a may be a hand brake to assist in controlling the speed of the assembly 10, while the lever 112b of the second handle bar 110b may be used to transition the locking mechanism 90 between the locked and unlocked positions 96, 98. In other embodiments of the invention, the levers 112a, 112b may be switched. In yet other embodiments of the invention, one of the left and right handle bar 110a may include one or more levers 112, while the other includes no levers 112. Whether provided for left hand or right hand operational orientation, it is appreciated that operation of a braking assembly that is operatively associated with a respective brake lever is operable to provide greater resistance to the travel of assembly 10 relative to ground surfaces. Such considerations mitigate potential of the user succumbing to the translational forces associated with use of assembly 10 and attributable to conditions of the terrain; such as grade, moisture, or footing; and/or the mass and evenness of the load being transported.

The dipped portion 106 is configured to act as a stand for the wheeled portion 14. That is, upon removal of the wheeled portion 14 from the pack portion 12, a user 18 is able to set wheeled portion 14 on the ground. The dipped portion 106 extends toward the ground in order to space the hand grips 110 from the ground. This allows a user 18 to easily grab the hand grips 110 in order to resume use without bending all the way to the ground.

Figure 10:
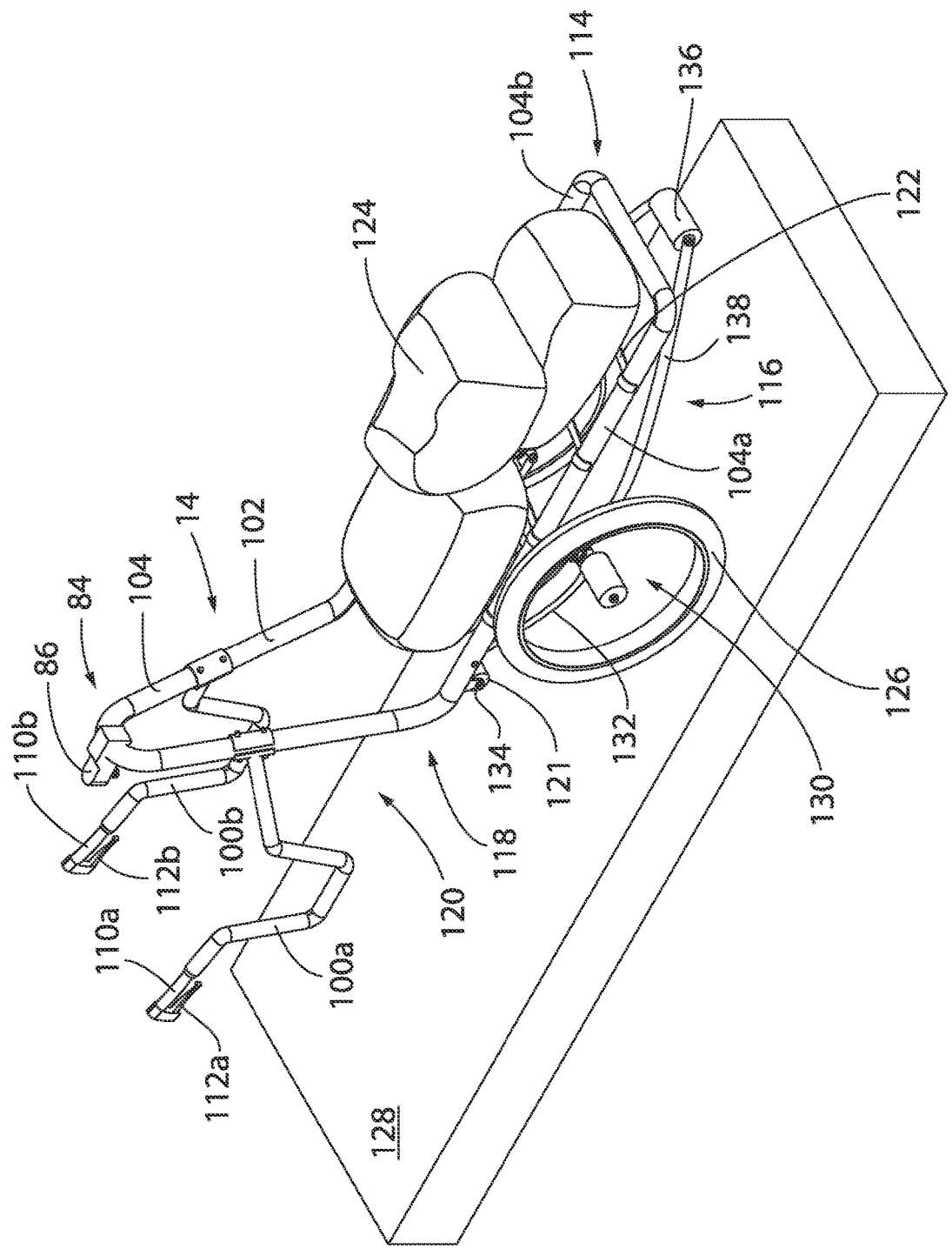
FIG. 10 is a perspective view from a rearward orientation of the wheeled portion of the wheel pack assembly and associated with a ground surface.

Referring now to FIG. 10, the wheeled portion 14 of the assembly 10 is shown separate from the pack portion 12. As mentioned above, the wheeled portion 14 includes a frame 104. The frame 104 extends from the forward end 84 of the wheeled portion 14 to a rear end 114 of the wheeled portion 14. The frame 104 includes a first, lateral portion 116 extending from the rear end 114 to a bend location 118. The frame 104 may also include a second, angled portion 120 extending from the bend location 118 to the forward end 84 and forming the above-mentioned forward shaft 102 of the frame 104. In the representative embodiment of the invention, the angled portion 120 extends upward at an angle from lateral portion 116 at the bend location 118. It is contemplated that the angled portion 120 may extend from the lateral portion 116 at any angle between 0° and 180° and, more preferably, any angle between 90° and 180°.

As shown in FIG. 10, the frame 104 includes a left portion 104a and a right portion 104b. While the left and right portions 104a, 104b are depicted as merging at the coupler 86 and the rear end 114, it is contemplated that the left and right portions 104a, 104b of the frame 104 may join together at a variety of locations between the forward and rear ends 84, 114 of the wheeled portion 14. In addition, at least one crossbar 121 may extend between the left and right portions 104a, 104b of the frame 104 to provide additional rigidity and mitigate twisting or racking of the frame 104. The representative embodiment of the invention, depicts a crossbar 121 extending between the left and right portions 104a, 104b of the frame at the bend location 118. However, other embodiments of the invention may include one or more crossbars 121 at various locations along the frame 104.

The wheeled portion 14 may also include a bed 122 extending along the lateral portion 116 of the frame 104. In the representative embodiment of the invention, the bed 122 includes a number of straps extending from the left portion 104a of the frame 104 to the right portion 104b of the frame. The straps provide a bed 122 upon which a load 124 may be placed and/or otherwise supported or secured. In other embodiments of the invention, the bed 122 may be a single piece of fabric extending between the left and right portions 104b of the frame from all of or a portion of the distance between the rear end 114 and the bend portion 118.

A wheel set 126 may be coupled to the frame 104, so as to allow the wheeled portion 14, and the assembly 10 as a whole, to roll over a ground surface 128. As shown in FIGS. 1 and 10, the wheel set 126 is disposed along the lateral portion 118 of the frame 104 at a location 130 that preferably provides a balanced configuration of assembly 10 relative to the user. More preferably, location 130 and the load associated with assembly 10 only slightly loads toward the forward facing portion of assembly 10 such that the same preferably neither overloads the user nor produces an appreciable upwardly directed force associated with the ball and hitch engagement. Understandably, such loading will depend largely on the weigh associated with discrete loads and placement of the same relative to location 130. In the representative embodiment of the invention, the location 130 is between and spaced apart from the bend 118 and the rear end 114 of the wheeled portion 14. As a result, the weight of the load 124 is better centered over the wheel set 126 to reduce stress on the user 18. As shown in FIG. 1, the wheel set 126 may be coupled to the frame 104 via a wheel bar 132. The wheel bar 132 extends from the lateral portion 114 of the frame 114 to the previously discussed location 130. While FIG. 1 shows the wheel bar 132 as being coupled to the frame 104 at a location adjacent the bend 118, it is contemplated that the wheel bar 132 may be coupled to the frame 104 at any location.

In addition, the wheeled portion 14 may include a secondary wheel set 134 disposed forward of the wheel set 126. The secondary wheel set 134 is coupled to the frame 104 and sized smaller than the wheel set 126. The secondary wheel set 134 is configured to mitigate damage to frame 104 of assembly 14 should it engage an obstacle, such as a rock, tree trunk, or the like, during use. Additionally, the wheeled portion 14 may also include a tertiary wheel set 136 disposed rearward of the wheel set 126. The tertiary wheel set 136 is located beyond the rear end 114 and configured to engage an obstacle to prevent the obstacle from damaging the rear end 114. As shown in FIG. 1, the tertiary wheel set 136 may be coupled to the first wheel set 126 by a support bar 138. In other embodiments of the invention, the support bar 138 may alternatively couple the tertiary wheel set 136 to the laterally oriented portion 116 of the frame 104. The support bar 138 may be configured to have a requisite stiffness to assist in slowly and smoothly lowering the wheeled portion 14 from a higher elevation to a lower elevation over an obstacle.

Further yet, a stabilizing element 140 may be coupled to the wheel set 126 to provide stabilization for the load 124 during transportation. The stabilizing element 140 may be in the form of a shock absorber, a spring, or the like extending between the frame 104 and an axle 127 of the wheel set 126. The combination of stabilizing elements 78, 140 and articulating arms 38 provide for a smooth transition of the wheeled portion 14 across variable or uneven terrain 128 and/or obstacles. As stated above, the ability of the articulating arms 38 and hinge plate 40 to rotate about horizontal axis 54, 56, 60, 70, allows the wheeled portion 14 to transition with the variable terrain 128 without providing additional stress on the pack portion 12 and thereby the user 18. That is, the wheeled portion 14 and elements of the frame support 34 are able to transition with the variable terrain 128 without causing movement of the back support 20 of the pack portion 12.

It is contemplated that in at least one embodiment of the invention, the wheeled portion 14 of the assembly 10 may include a power assist motor and power braking. In such an instance, the ball 88 may include a forward sensor and a rear sensor. The forward sensor is disposed on a forward side of the ball 88 and configured to sense when the coupler 86 is pulling on the ball 88. Upon such an indication, the power assist motor may provide power to the wheel set 128 and assist the user 18 in moving forward. The rear sensor is disposed on a rear side of the ball 88 and configured to sense when the coupler 86 is pushing on the ball 88. Upon such an indication, the power braking may provide brake assistance to assist the user 18 in slowing down. It is contemplated that such systems may be powered by a battery, such as a rechargeable battery. Further, the assembly 10 may include a solar panel to charge the battery. It is further appreciated that the relative forward and rearward indicating sensors could alternatively be positioned rearward or forward of ball 88. It is further appreciated that the functionality associated with the respective sensors could be provided by a single sensor having a neutral configuration, i.e. neither braking or driving, disposed between a range of operation of the respective sensor.

In yet another embodiment of the invention, the frame 104 of the wheeled portion 14 may be comprised to be easily collapsible to reduce the size of the assembly 10 for transportation. For example, the wheeled portion 14 may be foldable at the bend 118 of the frame 104. In addition, the handlebars 100 may be removable or foldable back on to the frame 104. An embodiment of the invention depicting the collapsibility of the assembly 10 is disclosed further below with respect to the orientation shown in FIGS. 11 and 12.

Figure 11:
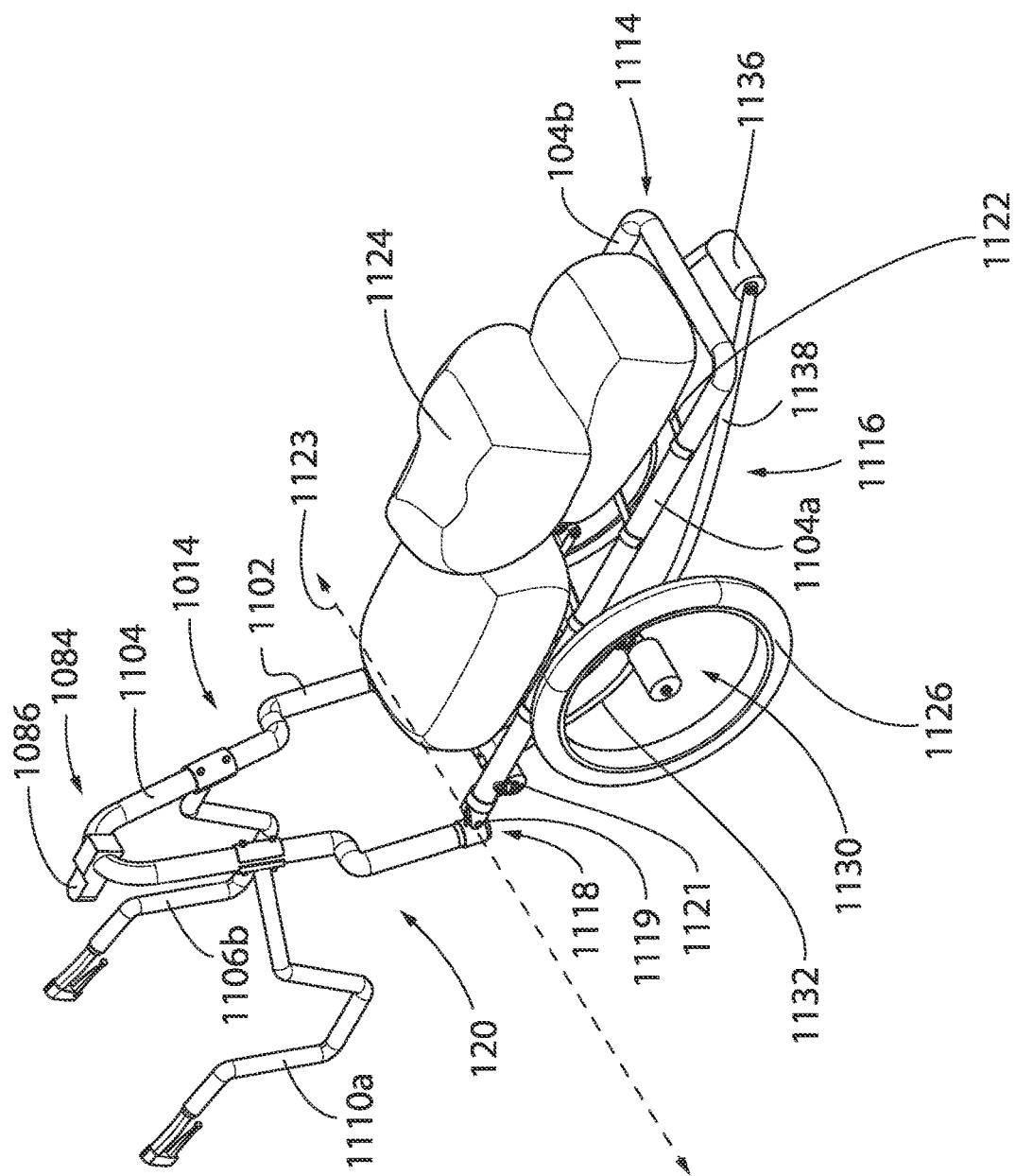
FIG. 11 is a perspective view of a wheeled portion of a wheel pack assembly according to another embodiment of the present invention.
Figure 12:
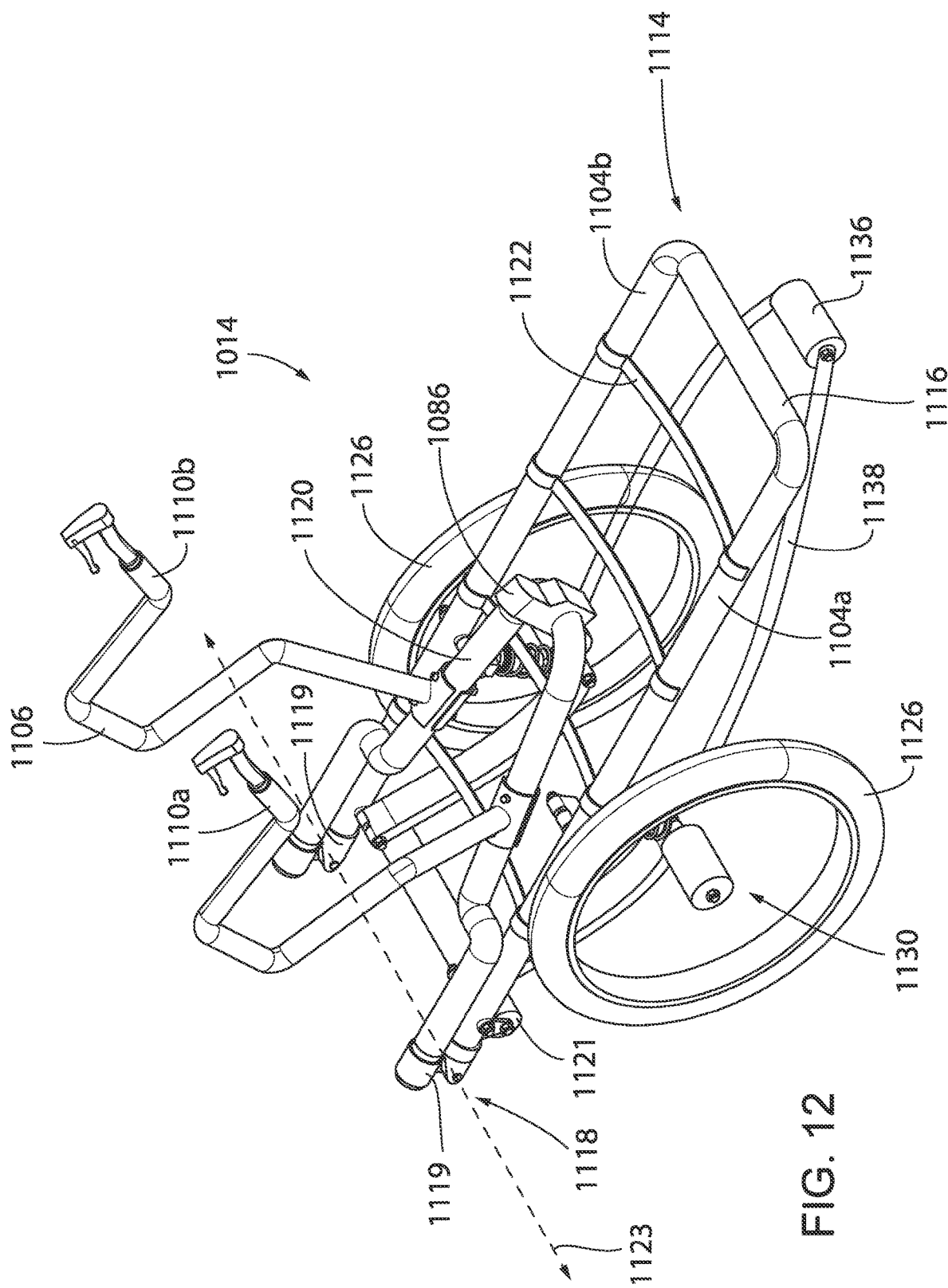
FIG. 12 is a perspective view of the wheeled portion of FIG. 11 shown in a stowed or storage orientation.

FIGS. 11 and 12 depict such a collapsible wheeled portion 1014. The wheeled portion 1014 is constructed mostly similar to the wheeled portion 14 shown in FIGS. 1-10, as reflected by the numbering similarities between the respective figures. In FIGS. 11 and 12, a hinge 1119 is disposed at each bend 118 of the frame 1104 in order to allow the frame 1104 to be collapsible and reduce the size of the wheeled portion 1014 during storage and transportation.

The hinge 1119 divides the frame 1104 into a first portion 1120 and a second portion 1116, which are able to pivot about a pivot axis 1123. The pivot axis 1123 extends between each of the hinges 1119 that transverse the frame 1104. In turn, the first portion 1120 and the second portion 1116 of the frame 1104 are able to pivot with respect to each other about the pivot axis 1123. While the representative embodiment of the invention illustrates the use of two (2) hinges 1119, alternative embodiments of the invention may use any number of hinges 1119 disposed along the pivot axis 1123.

FIG. 11 depicts the frame 1104 in a use or an operation orientation. In the operation orientation, the first portion 1120 of the frame 1104 extends upward at an angle from second portion 1116 at the hinge 1119. It is contemplated that the angle may any angle between 0° and 180° and, more preferably, any angle between 90° and 180°. Meanwhile, FIG. 12 depicts the frame 1104 in a stowed or storage orientation. In the storage orientation, the first portion 1120 of the frame 1104 is folded toward the second portion 1116 about the pivot axis 1123. As shown, the first portion 1120 is preferably folded about the pivot axis 1123 to be virtually parallel to the second portion 1116. In varying embodiments of the invention, the first portion 1120 may be oriented at an angle between 0° and 45° with respect to the second portion 1116 and, more particularly at an angle between 0° and 15°.

Figure 13:
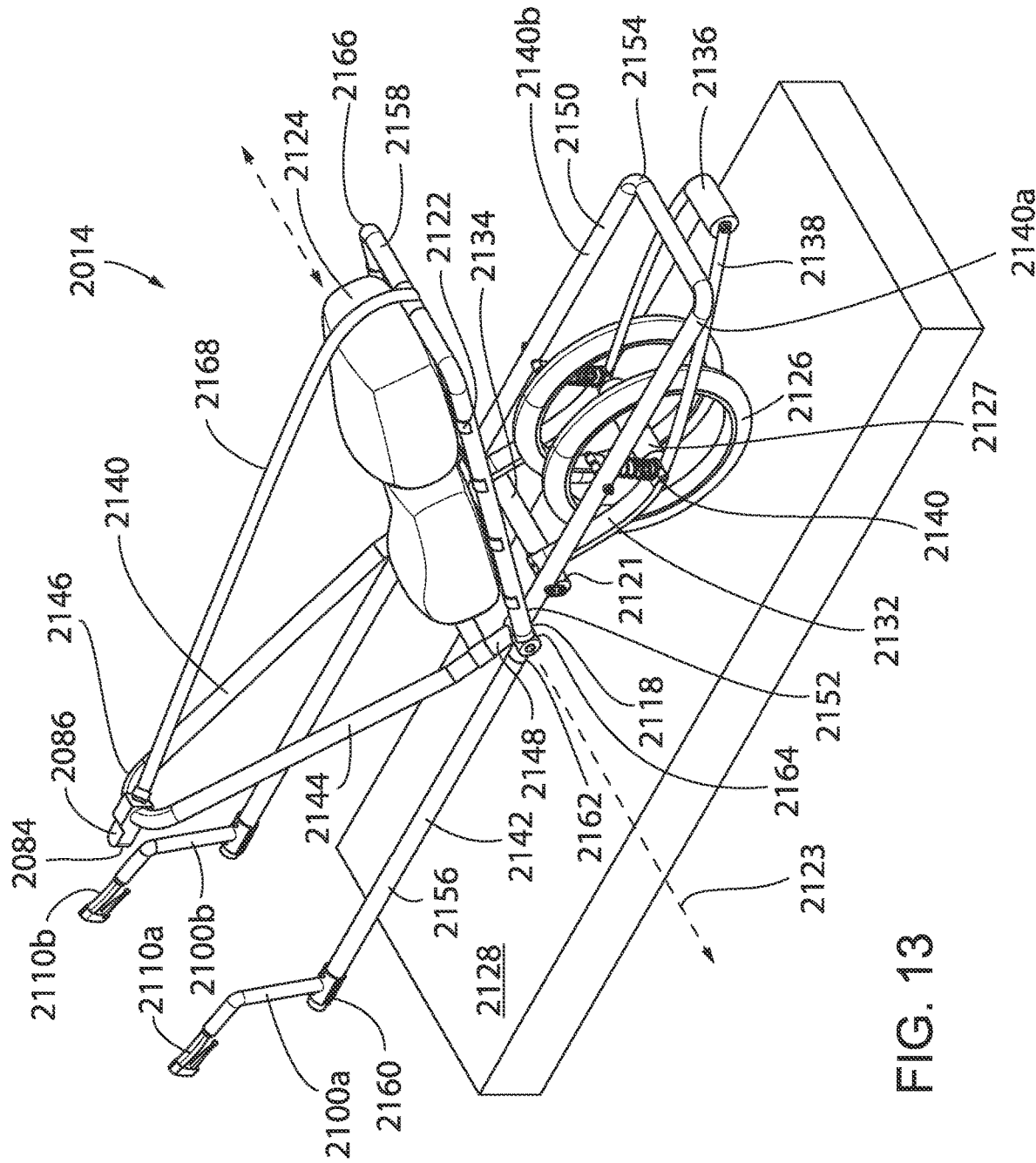
FIG. 13 is a perspective view of a wheeled portion of a wheel pack assembly according to yet another embodiment of the present invention.
Figure 14:
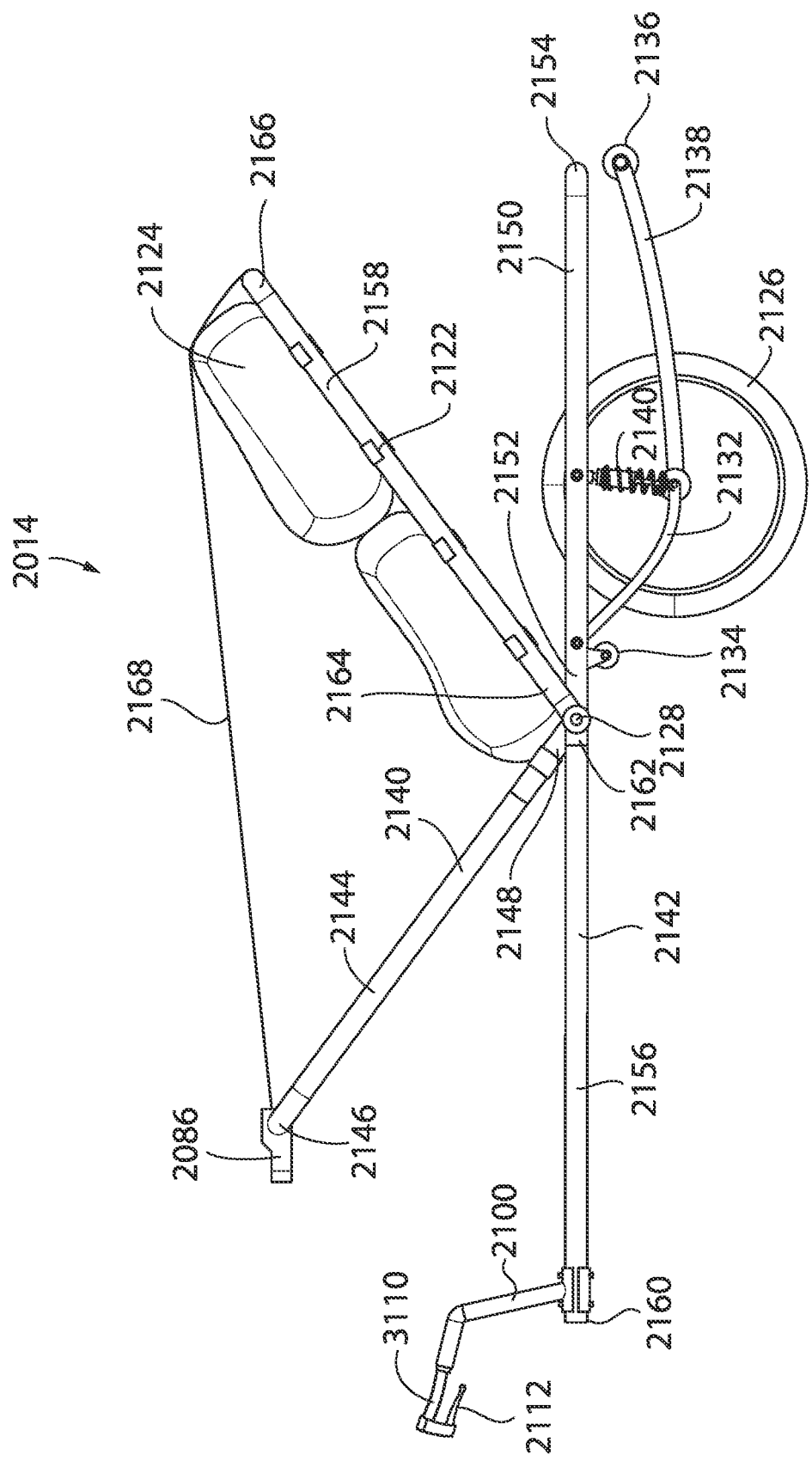
FIG. 14 is a side elevation view of the wheeled portion of FIG. 13 in an operation orientation.
Figure 15:
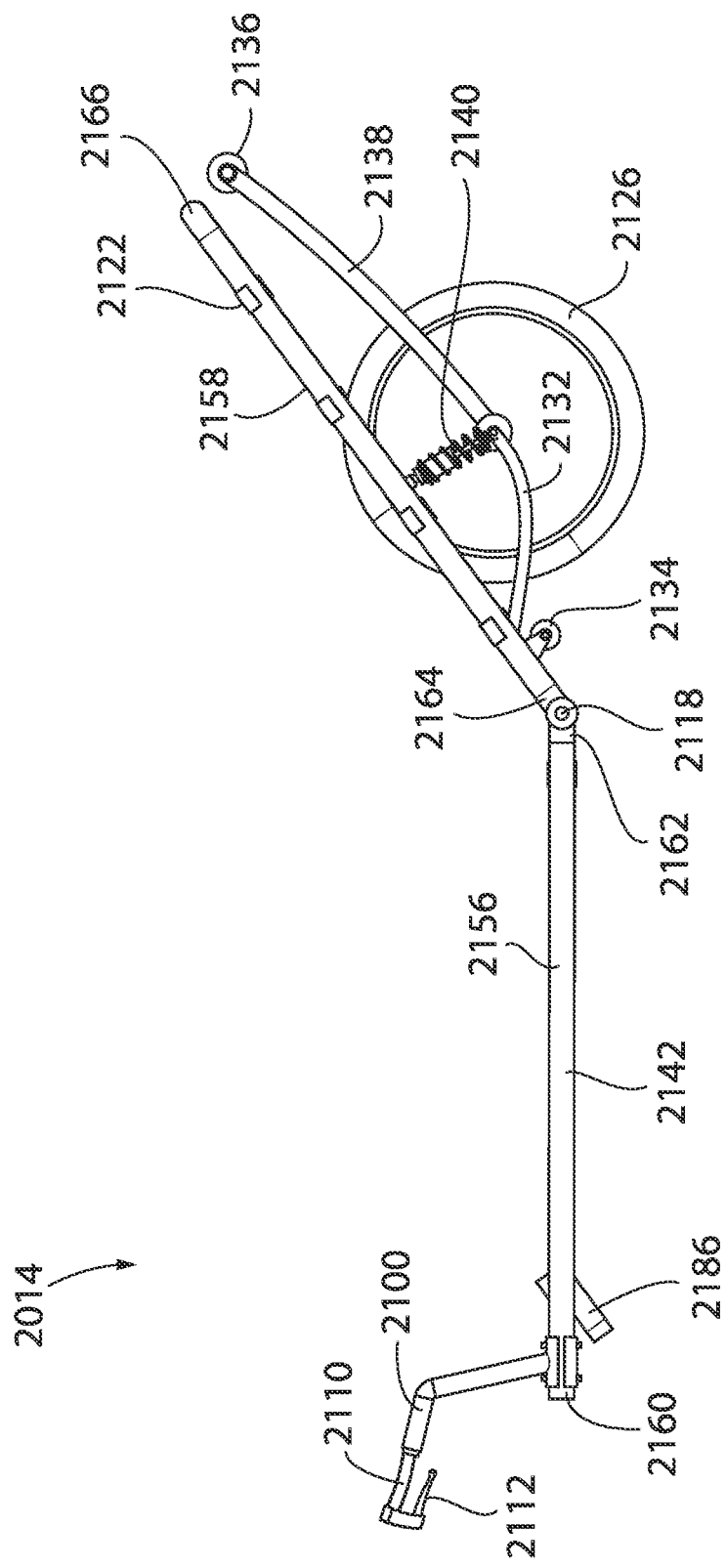
FIG. 15 is a side elevation view of the wheeled portion of FIG. 13 in a storage orientation.

Now referring to FIGS. 13-15, another embodiment of a wheeled portion 2014 of an assembly 2010 is shown. Similar to the previously described wheeled portions, the wheeled portion 2014 of FIGS. 13-15 includes a coupler 2086 disposed at a forward end 2084 of the wheeled portion 2014. The coupler 2086 is configured to interfit with the previously described hitch 72 to removably couple the wheeled portion 2014 to the pack portion 12.

The wheeled portion 2014 includes a frame 2104 divided into a first frame portion 2140 and a second frame portion 2142 that are pivotably connected to each other at at least one point along a pivot axis 2123. The first and second frame portions 2140, 2142 are configured to pivot with respect to each other about the pivot axis 2123 to transition between an operation orientation (FIGS. 13 and 14) and a storage orientation (FIG. 15). As previously mentioned, the frame 2104 may comprise hollow tubes to reduce the weight of the wheeled portion 2014. The first frame portion 2140 includes a first leg 2144 extending from a first end 2146 to a second end 2148 disposed at the pivot axis 2123. In the operation orientation shown in FIGS. 13 and 14, the first leg 2144 extends from the pivot axis 2123 upward and forward at an angle. The previously described coupler 2086 is coupled to the first end 2146 of the first leg 2144. The first frame portion 2140 also includes a second leg 2150 extend from a first end 2152 at the pivot axis 2123 to a second end 2154. In the operation orientation shown in FIGS. 13 and 14, the second leg 2150 extends rearward from the pivot axis 2123 generally parallel to the ground surface 2128. In the representative embodiment of the invention, the first frame portion 2140 transitions from the first leg 2144 to the second leg 2150 at a bend location 2118 disposed at the pivot axis 2123. In other embodiments of the invention, the first and second legs 2144, 2150 may be separate elements joined together at the bend location 2118 and pivot axis 2123. It is contemplated that the first frame portion 2140 may extend from the second leg portion 2150 at any angle between 0° and 180°, preferably, any angle between 90° and 180°.

As shown, the first frame portion 2140 includes a left portion 2140a and a right portion 2140b. In the representative embodiment of the invention, the left and right portions 2140a, 2140b are depicted as merging at the coupler 2086 and the second end 2154. In other embodiments of the invention, it is contemplated that the left and right portions 2140a, 2140b of the frame 2104 may join together at a variety of locations between the coupler 2084 and the second end 2154 of the second leg 2150. The first frame portion 2140 may also include at least one crossbar 2121 extending between the left and right portions 2140a, 2140b of the first frame portion 2140 to provide additional rigidity and mitigate twisting or racking of the first frame portion 2140. The representative embodiment of the invention depicts a crossbar 2121 extending between the left and right portions 21400a, 2140b at a location along the second leg 2150 adjacent to the bend location 2118. However, other embodiments of the invention may include one or more crossbars 2121 at various locations along the first frame portion 2140.

In addition, a wheel set 126 is coupled to the first frame portion 2140. As shown in FIGS. 13-15, the wheel set 126 is disposed along the second leg 2150 of the first frame portion 2140 at a location between the first and second ends 2152, 2154 of the second leg 2150. As shown, the wheel set 2126 may be coupled to the frame first frame portion 2140 by way of a wheel bar 2132, which extends from the second leg 2150 of the first frame portion 2140 to the previously discussed location 2130. In the representative embodiment of the invention, the wheel bar 2132 extends from the crossbar 2121. In varying embodiments of the invention, the wheel bar 2132 may be coupled to the second leg 2150 of the first frame portion 2140 at any location. FIGS. 13-15 depict the wheel set 126 as being disposed between the left and right portions 2140a, 2140b. Disposing the wheel set 2126 between the left and right portions 2140a, 2140b, renders the wheeled portion 2014 able to transition between the operation orientation and the storage orientation without the wheel set 2126 interfering with the movement of the frame portions 2140, 2142.

The wheeled portion 2014 may also include a secondary wheel set 2134 disposed forward of the wheel set 2126. The secondary wheel set 2134 is coupled to the frame 2104, sized smaller than the primary wheel set 2126, and is configured to mitigate damage to frame 2104 of wheeled portion 2104 should it engage an obstacle, such as a rock, tree trunk, or the like, during use. In the representative embodiment of the invention, the secondary wheel set 2134 is disposed at the same location as the crossbar 2121. In other embodiments of the invention, the secondary wheel set 2134 and the crossbar 2121 may be disposed at different locations along the length of the second leg 2150 of the first frame portion 2140.

Further, the wheeled portion 2014 may include a tertiary wheel set 2136 disposed rearward of the primary wheel set 2126. The tertiary wheel set 2136 is located beyond the second end 2154 of the second leg 2150 and configured to engage an obstacle to prevent the obstacle from damaging a rear end 2114 of the wheeled portion 2014 and so as to guide the assembly thereabout. As shown in FIG. 13, the tertiary wheel set 2136 is coupled to the first wheel set 2126 by a support bar 2138. In other embodiments of the invention, the support bar 2138 may alternatively couple the tertiary wheel set 2136 to the first frame portion 2140. It is contemplated that the support bar 2138 may be configured to have a requisite stiffness to assist in slowly and smoothly lowering the wheeled portion 2014 from a higher elevation to a lower elevation over an obstacle.

Further yet, a stabilizing element 2140 may be coupled to the primary wheel set 2126 to provide stabilization for the wheeled portion 2014 and the load 2124 thereon during transportation across variable or uneven terrain 128 and/or obstacles. The stabilizing element 2140 may be in the form of a shock absorber, a spring, or the like extending between the first frame portion 2140 and an axle 2127 of the primary wheel set 2126.

Similar to the first frame portion 2140, the second frame portion 2142 includes a first leg 2156 and a second leg 2158. The first leg 2156 extends from a first end 2160 to a second end 2162 disposed at the pivot axis 2123. In the operation orientation, the first leg 2156 extends forward from the pivot axis 2123 generally parallel to the ground surface 2128. Similarly, the second leg 2158 extends from a first end 2164 disposed at the pivot axis 2123 to a second end 2166. In the operation orientation, the second leg 2158 extends from the pivot axis 2164 upward and rearward at an angle. In the representative embodiment of the invention, the second frame portion 2142 transitions from the first leg 2156 to the second leg 2158 at the bend location 2118, which is aligned with the pivot axis 2123. In other embodiments of the invention, the first and second legs 2156, 2158 may be separate elements joined together at the bend location 2118 and pivot axis 2123. It is contemplated that the second leg 2158 may extend from the first leg 2156 at any angle between 0° and 180°, preferably, any angle between 90° and 180°. In the representative embodiment of the invention, the angle at which the second leg 2158 extends from the first leg 2156 is the same as the angle at which the first leg 2144 extends from the second leg 2150. However, these angles may be the same or different in varying embodiments of the invention and/or provided in an adjustable form factor to satisfy discrete user preferences.

Similar to the first frame portion 2140, the second frame portion 2142 includes a left portion 2142a and a right portion 2142b. In the representative embodiment of the invention, the left and right portions 2142a, 2142b are depicted as merging at the second end 2166 of the second leg 2158 and remaining spaced apart at the first end 2160 of the first leg 2156. In other embodiments of the invention, it is contemplated that the left and right portions 2142a, 2142b may join together at a variety of locations along the length of the first and second legs 2156, 2158.

The second frame portion 2142 of the wheeled portion 2014 also includes a bed 2122 extending along the second leg 2158. In the representative embodiment of the invention, the bed 2122 includes a number of straps extending between the left portion 2142a to the right portion 2142b along the length of the second leg 2158. The straps provide a bed 2122 upon which the load 2124 may be laid. In addition, the first leg 2144 of the first frame portion 2140 may also include straps extending between the left and right portions 2140a, 2140b at a location adjacent the second end 2148 of the first leg 2144 to expand the bed 2122 of the wheeled portion 2014.

In other embodiments of the invention, the bed 2122 may be a single piece of fabric extending between the left and right portions 2142a, 2142b for all of or a portion of the length of the second leg 2158. Further yet, the bed 2122 may include a piece of fabric extending between left and right portions 2140a, 2140b for a portion of the first leg 2140 of the first frame portion 2140 to expand the bed 2122.

The wheeled portion 2014 may also include handle bars 2100 coupled to the first leg 2156 of the second frame portion 2142. In the representative embodiment of the invention, the handle bars 2100 are disposed at or adjacent the first end 2160 of the first leg 2156. In other embodiments of the invention, the handle bars 2100 may be disposed at any location along the length of the first leg 2156. The handle bars 2100 include a left handle bar 2100a and a right handle bar 2100b disposed on either side of the user. Each handle bar 2100 includes a hand grip 2110 and preferably a lever 2112. In one embodiment of the invention, the lever 2112a associated with left handle bar 2110a may be a hand brake to assist in controlling the speed of travel of the underlying assembly, while the lever 2112b of the second handle bar 2110b may be used to transition the locking mechanism 90 between the locked and unlocked positions 96, 98. In other embodiments of the invention, the levers 2112a, 2112b may be switched. In yet other embodiments of the invention, one of the left and right handle bar 2110a may include one or more levers 2112, while the other includes no levers 2112.

FIGS. 13 and 14 further illustrate the use of a strap 2168 extending from the first end 2146 of the first leg 2144 of the first frame portion 2140 to the second end 2166 of the second leg 2158 of the second frame portion 2142. The strap 2158 is able to be removably coupled from one or both of the above-mentioned first end 2146 and second end 2166. In turn, the strap 2158 is able to distribute weight between the second frame portion 2142, which is felt by the user on the handle bars 2100, and the first frame portion 2140, which is felt by the user on the pack portion 12.

Referring now to FIG. 15, the wheeled portion 2014 is shown in the storage orientation, which reduces the overall space required to storage or transport the wheeled portion 2014 in a non-use configuration. In the storage orientation, the first and second frame portions 2140, 2142 are pivoted with respect to each other about the pivot axis 2123 so that the second legs 2150, 2158 are oriented parallel or generally parallel to each other, while the first legs 2144, 2156 are oriented parallel or generally parallel to each other. In the representative embodiment of the invention, the width of the first frame portion 2140 is less than the width of the second frame portion 2142 so that the first legs 2144, 2156 are along a similar plane, while the second legs 2150, 2158 are also oriented along their own similar plane. However, in other embodiments of the invention, it is contemplated that the width of the first frame portion 2140 may be greater than the width of the second frame portion 2142.

Further yet, while FIGS. 13-15 depict the wheel set 2126 as being disposed between the left and right portions 2140a, 2140b, other embodiments of the invention may have the wheel set 2126 disposed outside of the left and right portions 2140a, 2140. In turn, while FIGS. 13-15 depict the width of the second leg 2150 of the first frame portion 2140 as being less than the width of the second leg 2158 of the second frame portion 2142, other embodiments of the invention may have the width of the of the second leg 2150 of the first frame portion 2140 being greater than the width of the second leg 2158 of the second frame portion 2142.

Figure 16:
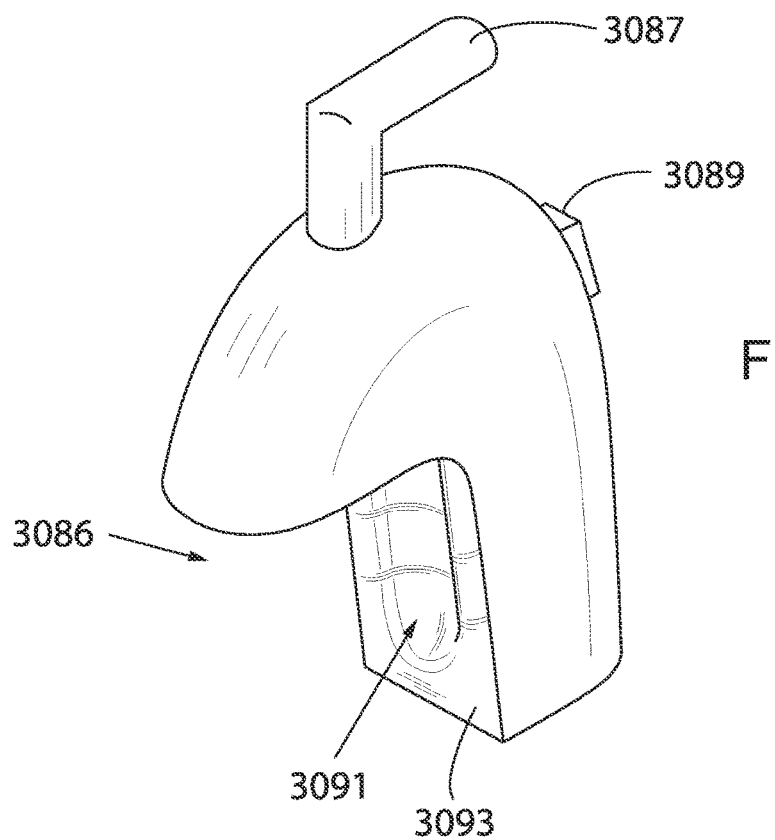
FIG. 16 is a perspective view of a coupler of the wheeled portion of a wheel pack assembly, according to yet another embodiment of the invention.
Figure 17:
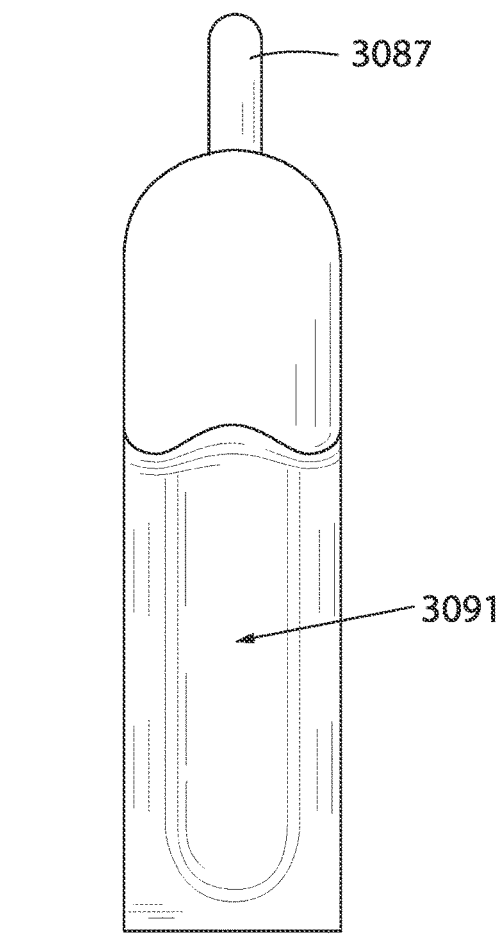
FIG. 17 is a front view of the coupler of FIG. 16.
Figure 18:
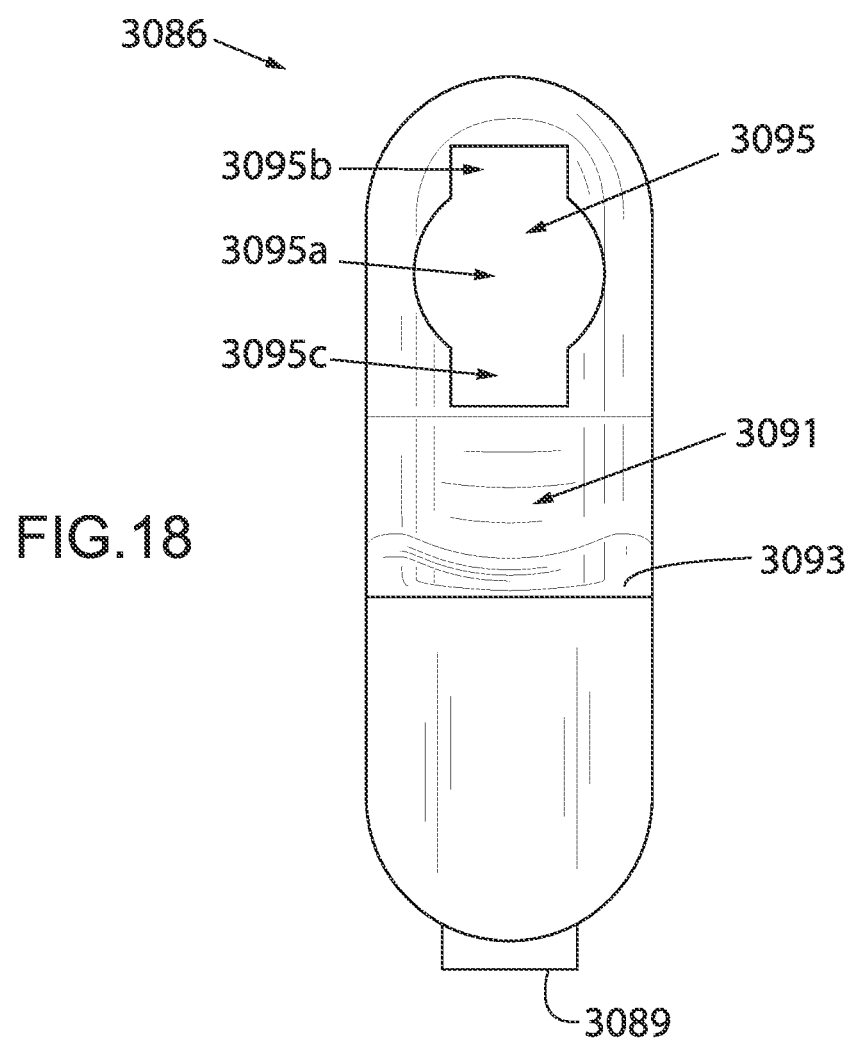
FIG. 18 is a bottom view of the coupler of FIG. 16.

Referring now to FIGS. 16-22, an enlarged view of a coupler 3086 of a wheeled portion 3014 of a pack assembly 3010 is shown. The couplers 86, 1086, 2086 previously discussed in the present application may be replaced with the coupler 3086 shown in FIGS. 16-22. FIGS. 16-18 illustrate a perspective view, front view, and bottom view of the coupler 3086. As shown in the perspective view of FIG. 16, the coupler 3086 may include a handle 3087 disposed thereon. The handle 3087 is located to allow a user to easily grasp the handle in order to manipulate the wheeled portion and its coupler 3086 to interfit with the associated hitch 3072 of the associated pack portion. While the handle 3087 is depicted as being located at a top portion of the coupler 3086, it is contemplated that the handle 3087 may be located anywhere on the coupler 3086 or adjacent the coupler 3086 on associated wheel assembly in varying embodiments of the invention. In addition, the coupler 3086 may include a mount 3089 disposed thereon configured to mount a recording device, such as a camera, to the coupler 3086. It is contemplated that such a recording device may be mounted to the coupler 3086 in a rear facing direction in order to record and allow a user to observe the wheeled portion of the pack assembly and what is happening behind the user. The recording device may be wirelessly connected (e.g., via Bluetooth or Wi-Fi) to an observation device, such as a cell phone in order to allow the user to observe the recording in real time.

FIGS. 16 and 17 further illustrate a groove 3091 formed in a surface 3093 of the coupler 3086. The groove 3091 is configured to partially or entirely receive a ball 3088 of a hitch 3072 in order to guide the ball 3088 of the hitch 3072 to an opening 3095 of the coupler 3086. In varying embodiments of the invention, the groove 3091 may be sized to extend forward of the opening 3095, rearward of the opening 3095, leftward of the opening 3095, rightward of the opening 3095, and/or any combination thereof. Because the coupler 3086 of the wheeled portion is disposed behind the user, the groove 3091 assists the user in mounting the wheeled portion to the pack portion without needing to see the coupler 3086 and hitch 3072.

Next, FIG. 18 illustrates the opening 3095 disposed in the surface 3093 of the coupler 3086. The opening 3095 is configured to allow the ball 3088 of the hitch 3072 to enter an interior 3092 of the coupler 3086. In the representative embodiment of the invention, the opening 3095 includes a central portion 3095a and secondary portions 3095b, 3095c extending forward and rearward from the central portion 3095a. The central portion 3095a is sized to be larger than the ball 3088 of the hitch 3072 to allow the ball 3088 of the hitch 3072 to enter the interior 3092 of the coupler 3086. Meanwhile, the secondary portions 3095b, 3095c are sized to have a width larger than a neck 3094 of the hitch 3072, but smaller than the ball 3088 of the hitch 3072. As a result, the neck 3094 of the hitch 3072 is able to pivot and move forward from the central portion 3095a and through the secondary portion 3095b forward of the central portion 3095a as the ball 3088 of the hitch 3072 pivots and moves forward within the interior 3092 of the coupler 3086. Similarly, the neck 3094 of the hitch 3072 is able to pivot and move rearward from the central portion 3095a and through the secondary portion 3095c rearward of the central portion 3095a as the ball 3088 of the hitch 3072 pivots and moves rearward within the interior 3092 of the coupler 3086. Additional effects of the ball 3088 of the hitch 3072 pivoting and moving forward and rearward within the interior 3092 of the coupler 3086 will described in further detail below.

Figure 19:
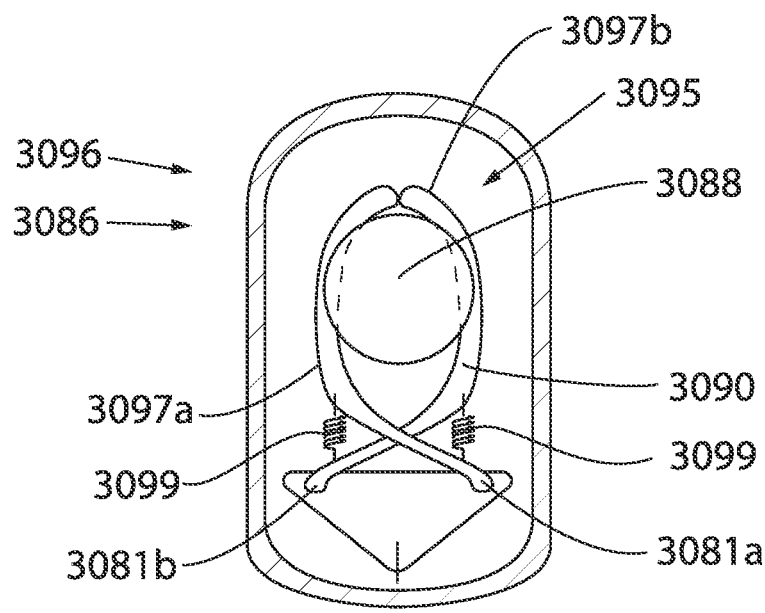
FIG. 19 is a top cross-sectional view of the coupler of FIG. 16 with a hitch disposed therein in a locked position.
Figure 20:
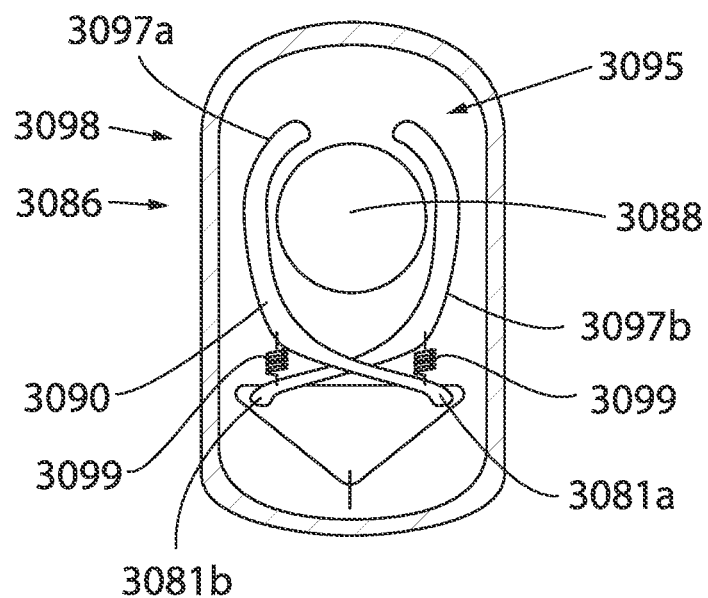
FIG. 20 is a top cross-sectional view of the coupler of FIG. 16 with a hitch disposed therein in an unlocked position.

Moving on to FIGS. 19 and 20, a top cross-sectional view of the coupler 3086 is shown with the ball 3088 of the hitch 3072 disposed in the interior 3092 of the coupler 3086. Similar to the coupler 86 shown in FIGS. 8 and 9, coupler 3086 includes a locking mechanism 3090 that transitions between a locked position 3096 (see FIG. 19) and an unlocked position 3098 (see FIG. 20). In the representative embodiment of the invention, the locking mechanism 3090 includes locking arms 3097a, 3097b in connection with a lever, such as lever 2112b shown in wheeled portion 2014 of FIG. 14. The locking mechanism 3090 may further include a tension member 3099 configured to maintain the locking arms 3097a, 3097b and the locking mechanism 3090 in the locked position 3096 when no input is received from the user via the lever.

The locking arms 3097a, 3097b articulate about pivot points 3081a, 3081b, respectively. In the locked position 3096 of FIG. 19, the locking arms 3097a, 3097b of the locking mechanism 3090 are brought adjacent the neck 3094 of the hitch 3072 so that the distance between the locking arms 3097a, 3098b is smaller than the diameter of the ball 3088 of the hitch 3072. As a result, the locking mechanism 3090 prevents disengagement between the ball 3088 and coupler 3086 when in the locked position 3096.

In response to activation of the lever, the locking mechanism 3090 is transitioned from the locked position 3096 of FIG. 19 to the unlocked position 3098 of FIG. 20. In the representative embodiment of the invention, the locking arms 3097a, 3097b are pivoted about their respective pivot points 3081a, 3082b so that the locking arms 3097a, 3097b are spaced apart from the neck 3094 of the hitch 3072. As a result, the distance between the locking arms 3097a, 3097b is increased. In the unlocked position 3098, the distance between the locking arms 3097a, 3097b is larger than the diameter of the ball 3088 of the hitch 3072. In turn, the locking mechanism 3090 allows disengagement between the ball 3088 and the coupler 3086 when in the unlocked position 3098.

As previously mentioned, the locking mechanism 3090 further includes at least one tension member 3099 (e.g., a spring) attached to the locking arms 3097a, 3097b. The tension member 3099 is provided so that the neutral position of the locking arms 3097a, 3098b and the locking mechanism 3090 is the locked position 3096. That is, activation of the lever overcomes the tension force applied to the locking arms 3097a, 3097b to transition the locking arms 3097a, 3097b and the locking mechanism 3090 from the locked position 3096 to the unlocked position 3098. In turn, release of the lever causes the tension member 3099 to transition the locking arms 3097a, 3097b from the unlocked position 3098 to the locked position 3096, during which the locking arms 3097a, 3097b are pivoted about their respective pivot points 3081a, 3081b so that the distance between the locking arms 3097a, 3097b is decreased back to a distance less than the diameter of the ball 3088 of the hitch 3072.

Referring now to FIGS. 21-23, the ball 3088 of a hitch 3072, such as hitch 72 shown in FIGS. 8 and 9, may be disposed within the interior 3092 of the coupler 3086. In the representative embodiment of the invention, a position sensor 3100 is shown as a first position sensor 3100a and a second position sensor 3100b. The first position sensor 3100a (also referred to as the forward position sensor, the acceleration sensor, or the motor assist sensor) is disposed within the interior 3092 of the coupler 3086 on a front interior surface 3102 of the coupler 3086. Likewise, the second position sensor 3100b (also referred to as the rear position sensor, the deceleration sensor, or the brake assist sensor) is disposed within the interior 3092 of the coupler 3086 on a rear interior surface 3104 of the coupler 3086.

As shown in FIG. 21, the ball 3088 of the hitch 3072 is disposed within the coupler 3086 in a neutral position 3001. When in the neutral position 3001, the ball 3088 of the hitch 3072 sits within the interior 3092 of the coupler 3086 without engaging either the forward position sensor 3100a or the rear position sensor 3100b. Although referred to as being located in relative forward and rearward positions and/or directions, it is appreciated that the cooperation and operation of sensors 3100a, 3100b can be configured to provide indications as to the respective forward and rearward directed bias associated with the respective coupler assembly as well as discrete respective laterally directed force vectors components.

Next, FIG. 22 illustrates the ball 3088 of the hitch 3072 disposed within the coupler 3086 in a first position 3002. When in the first or forward position 3002, the ball 3088 of the hitch 3072 sits within the interior 3092 of the coupler 3086 and is in contact with to engage the forward position sensor 3100a, while being spaced apart from the rear position sensor 3100b. When the forward position sensor 3100a is engaged, a signal may be sent to a controller 5002 (see FIG. 27) in order to control a motor 5004 (see FIG. 27). In the representative embodiment of the invention, when the forward position sensor 3100a is engaged, the controller 5002 may send a signal to the motor 5004 to provide power assist to a wheel set, such as wheel sets 126, 1126, to increase rotation of the wheel set. The degree of power assist provided to the motor 5004 may be proportional to the amount of force exerted by the ball 3088 of the hitch 3072 on the forward position sensor 3100a.

That is, the forward position sensor 3100a is engaged when the wheeled portion 3014 of the pack assembly 3014 is traveling slower than the pack portion 3012. In such circumstances, the ball 3088 of the hitch 3072 begins to pull on the coupler 3074 and user. In turn, the power assist system 5000 (see FIG. 27) may engage the motor 5004 (see FIG. 27) to assist with increasing the speed of the wheeled portion 3014.

Conversely, FIG. 23 illustrates the ball 3088 of the hitch 3072 as being disposed within the coupler 3089 in a second position 3003. When in the second or rear position 3003, the ball 3088 of the hitch 3072 sits within the interior 3092 of the coupler 3086 and is in contact with and engages the rear position sensor 3100b, while being spaced apart from the forward position sensor 3100a. When the rear position sensor 3100b is engaged, a signal may be sent to the controller 5002 (see FIG. 27) in order to control a brake 5003 (see FIG. 27) and/or the motor 5004 (see FIG. 27). In the representative embodiment of the invention, when the rear position sensor 3100b is engaged, the controller 5002 may send a signal to the motor 5004 to provide brake assist to a wheel set, such as wheel sets 126, 1126, to decrease rotation of the wheel set. The degree of braking by the brake 5003 and/or power assist provided to the motor 5004 may be proportional to the amount of force exerted by the ball 3088 of the hitch 3072 on the rear position sensor 3100b.

That is, the rear position sensor 3100b is engaged when the wheeled portion 3014 of the pack assembly 3014 is traveling faster than the pack portion 3012. In such circumstances, the coupler 3074 begins to push on the ball 3088 of the hitch 3072 and increase stress on the user. In turn, the power assist system 5000 (see FIG. 27) may engage the brake 5003 (see FIG. 27) and/or the motor 5004 (see FIG. 27) to assist with decreasing the speed of the wheeled portion 3014. As disclosed above, when configured to provide an indication as to a relative degree of lateral loading between the respective user portion and wheeled portion of the pack assembly, when provided in a wheeled configuration wherein discrete wheels are associated with opposite lateral sides of the wheeled portion of the pack assembly, disparate operating instructions can be communicated to each of the respective alternate lateral motors associated with the discrete wheels to mitigate lateral load vectors between the user portion and the wheeled portion of the respective pack assembly 3104. In a similar manner, turning instructions may be communicated to two or single wheeled configurations of wheeled pack portion 3012 and configured to mitigate instances of lateral loading between the wheeled portion and the user portion of the respective pack assembly 3014.

Figure 24:
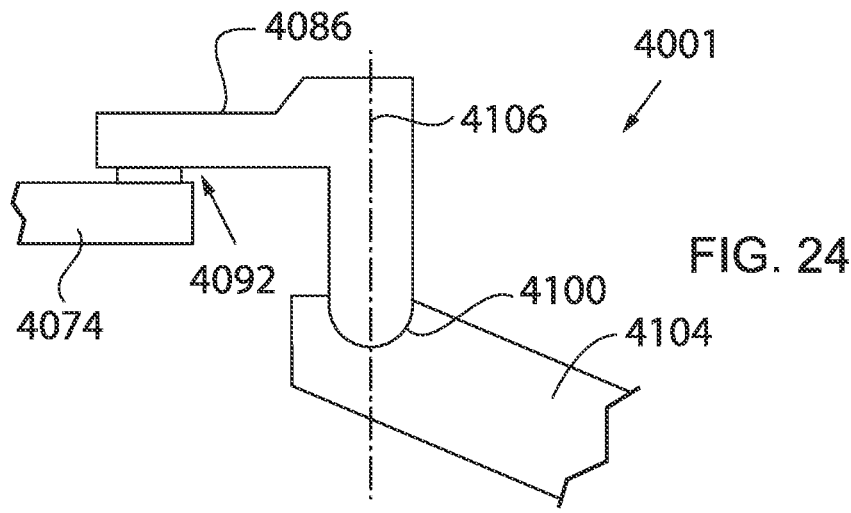
FIG. 24 is an enlarged perspective view of a coupler of a wheeled portion of a wheel pack assembly in a neutral position, according to another embodiment of the invention.
Figure 25:
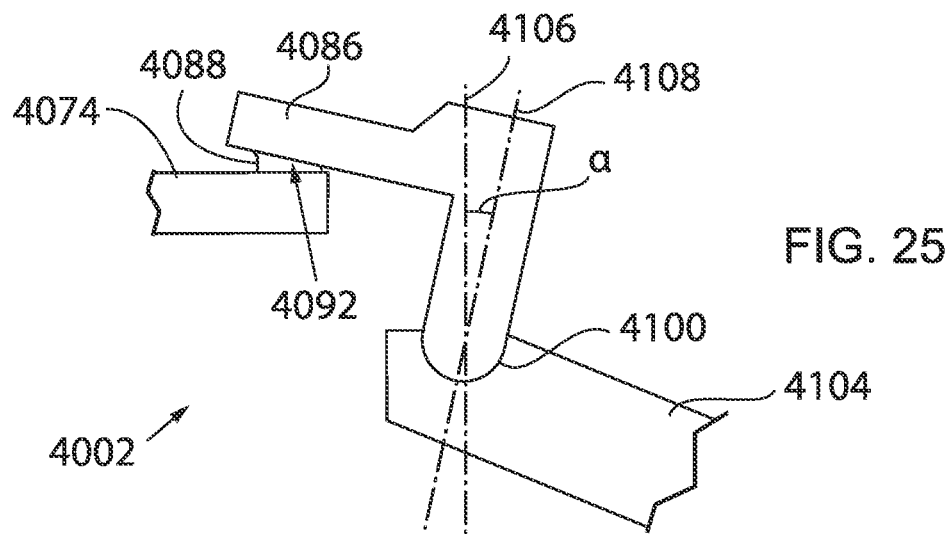
FIG. 25 is an enlarged perspective view of the coupler of FIG. 24 in a forward position.
Figure 26:
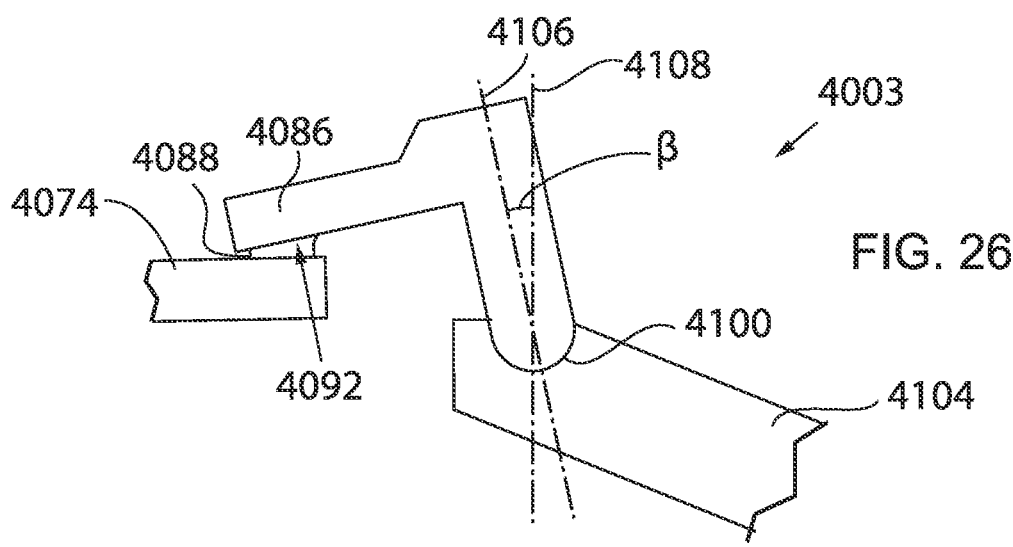
FIG. 26 is an enlarged perspective view of the coupler of FIG. 24 in a rearward position.

Referring next to FIGS. 24-26, an enlarged perspective view of a coupler 4086 of a wheeled portion 4014 of a pack assembly 4010 is shown. The couplers 86, 186, 2086 previously discussed in the present application may be replaced with the coupler 4086 shown in FIGS. 24-26. As described in previous embodiments, the hitch 4072 includes a ball 4088 disposed within a cavity 4092 of the coupler 4082.

In the representative embodiment of the invention, a position sensor 4100 is in the form of pivot pin or a rocker switch that allows the coupler 4086 to pivot with respect to the frame 4104 of the wheeled portion 4014 of the pack assembly 4010. FIG. 24 depicts the rocker switch 4100 in a neutral position 4001. In the neutral position 4001, the ball 4088 of the hitch 4072 is disposed within the cavity 4092 of the coupler 4086 without exerting any large force against the coupler 4086. In turn, the coupler 4086 is maintained in a position generally along a neutral axis 4106. While the neutral axis 4106 is shown as a vertical axis, varying embodiments of the invention may orient the neutral axis 4106 at varying angles depending on the design of the coupler 4086 and its attachment to the frame 4104.

FIG. 25 depicts the rocker switch 4100 in a first position 4002. In the first position 4002, the coupler 4086 is orientated along an axis 4108 offset from the neutral axis 4106 at an angle α. That is, the ball 4088 of the hitch 4072 disposed within the cavity 4092 exerts enough force on the coupler 4086 to move the coupler 4086 and transition the rocker switch 4100 to the first position 4002. When the rocker switch 4100 is in the first position 4002, a signal may be sent to the controller 5002 (see FIG. 27) in order to control the brake 5003 (see FIG. 27) and/or the motor 5004 (see FIG. 27). In the representative embodiment of the invention, when the rocker switch 4100 is in the first position 4002, the controller 5002 may send a signal to the brake 5003 and/or the motor 5004 to provide braking and/or power assist to a wheel set, such as wheel sets 126, 1126, to decrease rotation of the wheel set or the respective wheels associated therewith so as to urge coupler 4086 toward the respective desired neutral orientation during use thereof.

That is, the rocker switch 4100 may transition to the first position 4002 when the wheeled portion 4014 of the pack assembly 4010 is traveling faster than the pack portion 4012. In such circumstances, the ball 4088 of the hitch 4072 begins to push on the coupler 4074 and user. In turn, the power assist system 5000 (see FIG. 27) may engage the brake 5003 (see FIG. 27) and/or the motor 5004 (see FIG. 27) to assist with slowing the wheeled portion 4014.

Next, FIG. 26 depicts the rocker switch 4100 in a second position 4003. In the second position 4003, the axis 4108 of the coupler 4086 is offset from the neutral axis 4106 at an angle β. That is, the ball 4088 of the hitch 4072 disposed within the cavity 4092 exerts enough force on the coupler 4086 to move the coupler 4086 and transition the rocker switch 4100 to the second position 4003. When the rocker switch 4100 is in the second position 4003, a signal may be sent to the controller 5002 (see FIG. 27) in order to control the motor 5004 (see FIG. 27). In the representative embodiment of the invention, when the rocker switch 4100 is in the second position 4003, the controller 5002 may send a signal to the motor 5004 to provide power assist to a wheel set and/or the discrete wheels thereof, such as wheel sets 126, 1126, to increase rotation of the wheel set and thereby decrease the drag or rearward directed force imparted upon the user.

That is, the rocker switch 4100 may transition to the second position 4003 when the wheeled portion 4014 of the pack assembly 4010 is traveling slower than the pack portion 4012. In such circumstances, the ball 4088 of the hitch 4072 begins to pull on the coupler 4074 and increase stress on the user. In turn, the power assist system 5000 (see FIG. 27) may engage the motor 5004 (see FIG. 27) to assist with increasing the speed of the wheeled portion 4014 and to do so in a manner that does not overcome or overtake the user.

In an alternative embodiment of the invention, the position sensor 4100 may be in the form of a sensor disposed on the coupler 4086 and configured to sense and determine the orientation of the coupler 4086 as it pivots with respect to the frame 4104. Such an alternative position sensor may be disposed on the coupler 4086 to sense and determine the offset of the axis 4108 of the coupler 4086 from the neutral axis 4106.

Figure 27:
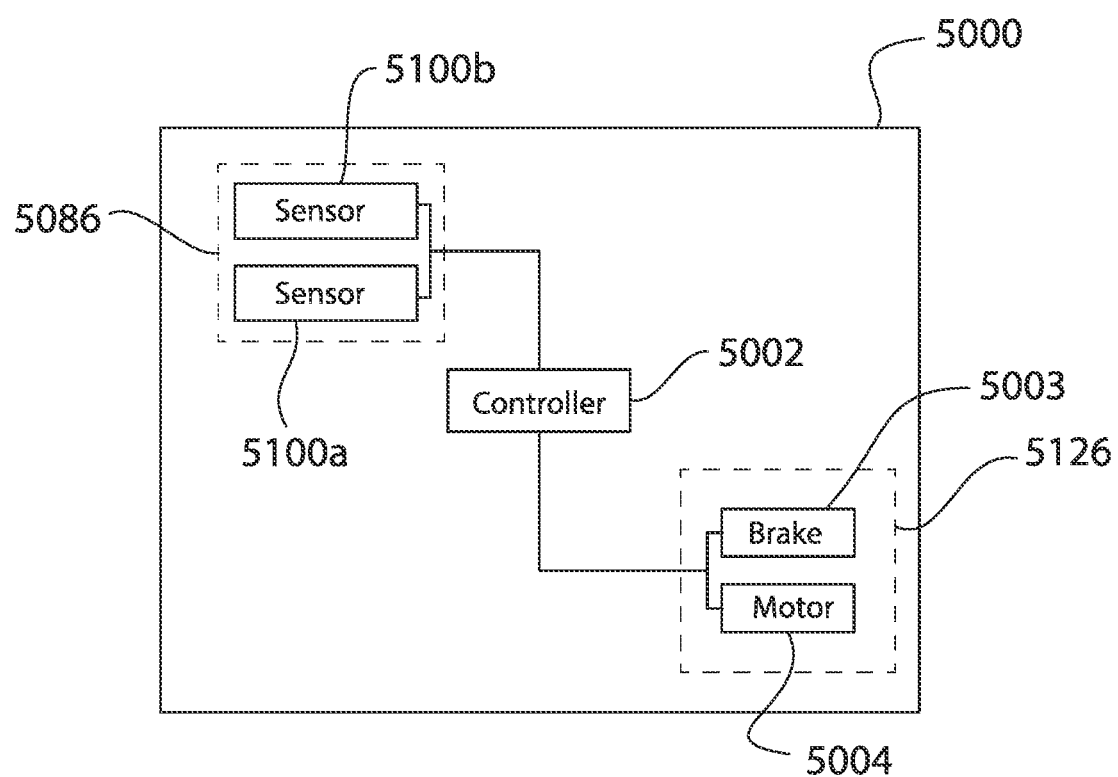
FIG. 27 is a schematic of a power assist system for the wheel pack assembly of FIG. 16.

Finally, FIG. 27 illustrates a schematic of the power assist system 5000 briefly described above. As shown, a sensor 5100, such as sensors 3100a, 3100b, 4100 described above, is disposed on or within the coupler 5086, such as couplers 3086, 4086 described above. The sensor 5100 is in communication with the controller 5002 either through a wired or wireless connection. The controller 5002 may be located on the wheeled portion of the pack assembly, the pack portion of the pack assembly, or separately located on the user. FIG. 27 further illustrates the controller 5002 in communication with one or more brakes 5003 and one or more motors 5004 either through a wired or wireless connection methodology. Each brake 5003 and motor 5004 is individually coupled to a discrete wheel and/or a wheel set 5126, such as wheel sets 26, 126, 1126.

As described above, the motor 5004 may operate in three different modes depending on the signals received from the controller 5002. When the coupler and hitch are in the neutral positions 3001, 4001, the controller 5002 sends a signal to the motor 5004 to operate in a neutral mode that does not affect the rotation speed of the wheel set. When the coupler and hitch are in positions 3003, 4002, the controller 5002 sends a signal to the brake 5003 to decrease the rotation speed of the discrete wheels and/or wheel set and/or sends a signal to the motor 5004 to operate in a first mode or power brake mode that operates to decrease the rotation speed of the discrete wheels and/or wheel set. When the coupler and hitch are in positions 3002, 4003, the controller 5002 sends a signal to the motor 5004 to operate in a second mode or acceleration mode that operates to increase the speed of rotation of discrete wheel or the pair of wheels of a wheel set.

It should be understood that the above description, while indicating representative embodiments of the present invention, is given by way of illustration and not of limitation. Many changes and modifications may be made within the scope of the present invention without departing from the spirit thereof, and the invention includes all such modifications. Various additions, modifications, and rearrangements are contemplated as being within the scope of the following claims, which particularly point out and distinctly claim the subject matter regarding as the invention, and it is intended that the following claims cover all such additions, modifications, and rearrangements.

I claim:

1. A wheel pack assembly comprising: a pack portion wearable by a user, the pack portion including a support frame having at least one articulating arm, at least one stabilizing element, and a first interfit element; and a wheeled portion removably coupled to the pack portion, the wheeled portion including: a frame having a first frame portion and a second frame portion; a second interfit element coupled to frame and configured to removably couple with the first interfit element of the pack portion; and a first wheel set coupled to the frame and disposed at a location spaced apart from a rear end of the wheeled portion;
- a power assist system including: a motor mechanically coupled to the first wheel set; at least one sensor coupled to at least one of the first interfit element and the second interfit element; and
- a controller configured to operate the motor based on feedback from the at least one sensor.

2. The wheel pack assembly of claim 1 wherein the first interfit element of the pack portion includes a hitch coupled to the support frame; and
- wherein the second interfit element of the wheeled portion includes a coupler at a forward end of the wheeled portion.

3. The wheel pack assembly of claim 2 wherein the at least one sensor is disposed on the coupler.

4. The wheel pack assembly of claim 3 wherein the at least one sensor comprises a first sensor disposed on a first interior surface of the coupler and a second sensor disposed on a second interior surface of the coupler; and
- wherein a ball of the hitch is able to move within an interior of the coupler to interact with the first and second sensors.

5. The wheel pack assembly of claim 3 wherein the at least one sensor comprises a rocker switch, the rocker switch comprising a pivot point where the coupler joins the wheeled portion allowing the coupler to rock forward and back in response to movement of the wheeled portion with respect to the pack portion.

6. The wheel pack assembly of claim 2 wherein the controller sends a signal to the motor to increase rotation of the first wheel set in response to the at least one sensor detecting the second interfit element pulling on the first interfit element;
- wherein the controller sends a signal to the motor to decrease rotation of the first wheel set in response to the at least one sensor detecting the second interfit element pushing on the first interfit element.

7. The wheel pack assembly of claim 2, further comprising a brake coupled to the first wheel set; wherein the controller sends a signal to the motor to increase rotation of the first wheel set in response to the at least one sensor detecting the second interfit element pulling on the first interfit element; wherein the controller sends a signal to the brake to decrease rotation of the first wheel set in response to the at least one sensor detecting the second interfit element pushing on the first interfit element.

8. The wheel pack assembly of claim 2 wherein the coupler includes a groove formed in a surface thereof configured to partially receive the hitch and configured to guide the hitch to an opening within the coupler.

9. The wheel pack assembly of claim 8 wherein an opening of the coupler is configured to receive the hitch and includes a central opening having a width larger than a diameter of a ball of the hitch, a first secondary portion extending from the central opening in a first direction and having a width smaller than the diameter of the ball of the hitch, and a second secondary portion extending from the central opening in a second direction and having a width smaller than the diameter of the ball of the hitch.

10. The wheel pack assembly of claim 1 wherein one of the first interfit element or the second interfit element includes a locking mechanism having a locked position and an unlocked position;
- wherein the first and second interfit elements are removable from each other in the unlocked position; and
- wherein the first and second interfit elements are not removable from each other in the locked position.

11. A wheel pack assembly comprising:
- a pack portion wearable by a user, the pack portion including a first interfit element; and a wheeled portion removably coupled to the pack portion, the wheeled portion including: a frame; a second interfit element coupled to frame and configured to removably couple with the first interfit element of the pack portion; and a primary wheel set coupled to the frame and disposed at a location spaced apart from a rear end of the wheeled portion;
- a power assist system including: a motor mechanically coupled to the primary wheel set; at least one sensor coupled to at least one of the first interfit element and the second interfit element; and
- a controller configured to operate the motor based on feedback from the at least one sensor.

12. The wheel pack assembly of claim 11 wherein the at least one sensor comprises a rocker switch pivotably coupling the second interfit element to the frame of the wheeled portion, the rocker switch configured to transition between a neutral position, a first position, and a second position in response to movement of the wheeled portion with respect to the pack portion.

13. The wheel pack assembly of claim 12 wherein the controller sends a signal to the motor to not operate when the rocker switch is in the neutral position; and wherein the controller sends a signal to the motor to increase rotation of the primary wheel set when the rocker switch is in a second position.

14. The wheel pack assembly of claim 13 wherein the controller sends a signal to at least one of:
- the motor to decrease rotation of the primary wheel set when the rocker switch is: . . . in the first position; and
- a brake attached to the first wheel set to decrease rotation of the primary wheel set when the rocker switch is in a second position.

15. The wheel pack assembly of claim 11 wherein the first interfit element of the pack portion includes a hitch coupled to the support frame; and
- wherein the second interfit element of the wheeled portion includes a coupler at a forward end of the wheeled portion.

16. The wheel pack assembly of claim 15 wherein the at least one sensor comprises a first sensor disposed within the coupler at a first location and a second sensor disposed within the coupler at a second location.

17. The wheel pack assembly of claim 16 wherein the controller sends a signal to at least one of:
- the motor to decrease rotation of the primary wheel set when the first sensor is engaged by the hitch; and
- a brake coupled to the primary wheel set to decrease rotation of the primary wheel set when the first sensor is engaged by the hitch.

18. The wheel pack assembly of claim 16 wherein the controller sends a signal to the motor to increase rotation of the primary wheel set when the second sensor is engaged by the hitch.

19. The wheel pack assembly of claim 16 wherein the coupler includes a locking mechanism having a locked position and an unlocked position;
- wherein the hitch and the coupler are removable from each other in the unlocked position; and wherein the hitch and the coupler are not removable from each other in the locked position.

20. The wheel pack assembly of claim 15, wherein the coupler includes: an opening configured to receive the hitch, the opening having: a central opening having a width larger than a diameter of a ball of the hitch; a first secondary portion extending from the central opening in a first direction and having a width smaller than the diameter of the ball of the hitch; and a second secondary portion extending from the central opening in a second direction and having a width smaller than the diameter of the ball of the hitch; a groove formed in a surface of the coupler, the groove configured to partially receive the hitch and configured to guide the hitch to the opening of the coupler.

* * * * *